March 29, 1955
E. T. GADBOIS
2,705,107
MULTIPLE TOTALIZER RECORDING AND
DISPLAYING ACCOUNTING MACHINE
Filed Dec. 22, 1949
20 Sheets-Sheet 9
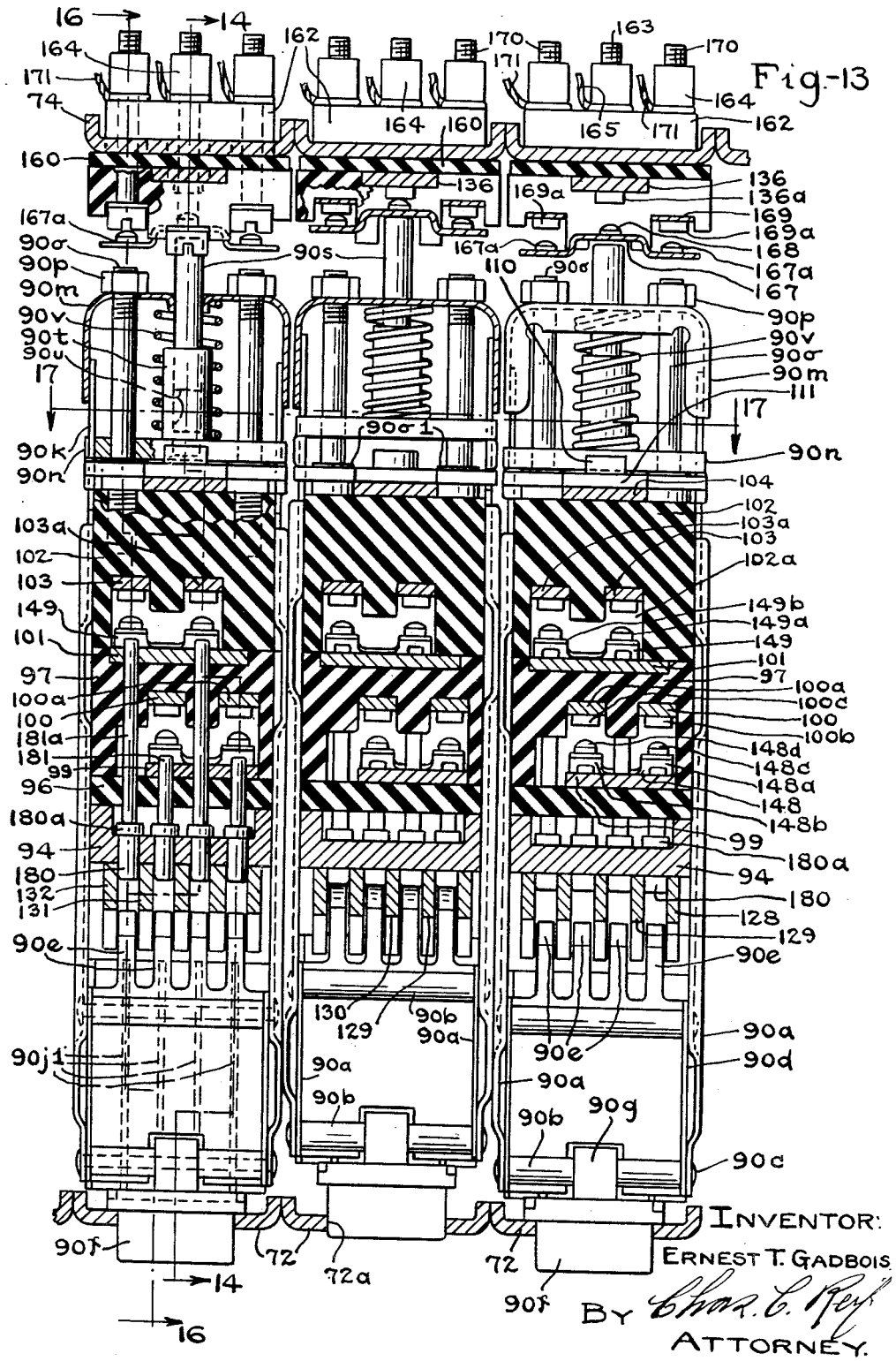
INVENTOR:
ERNEST T. GADBOIS
BY Chas. E. Rey
ATTORNEY.

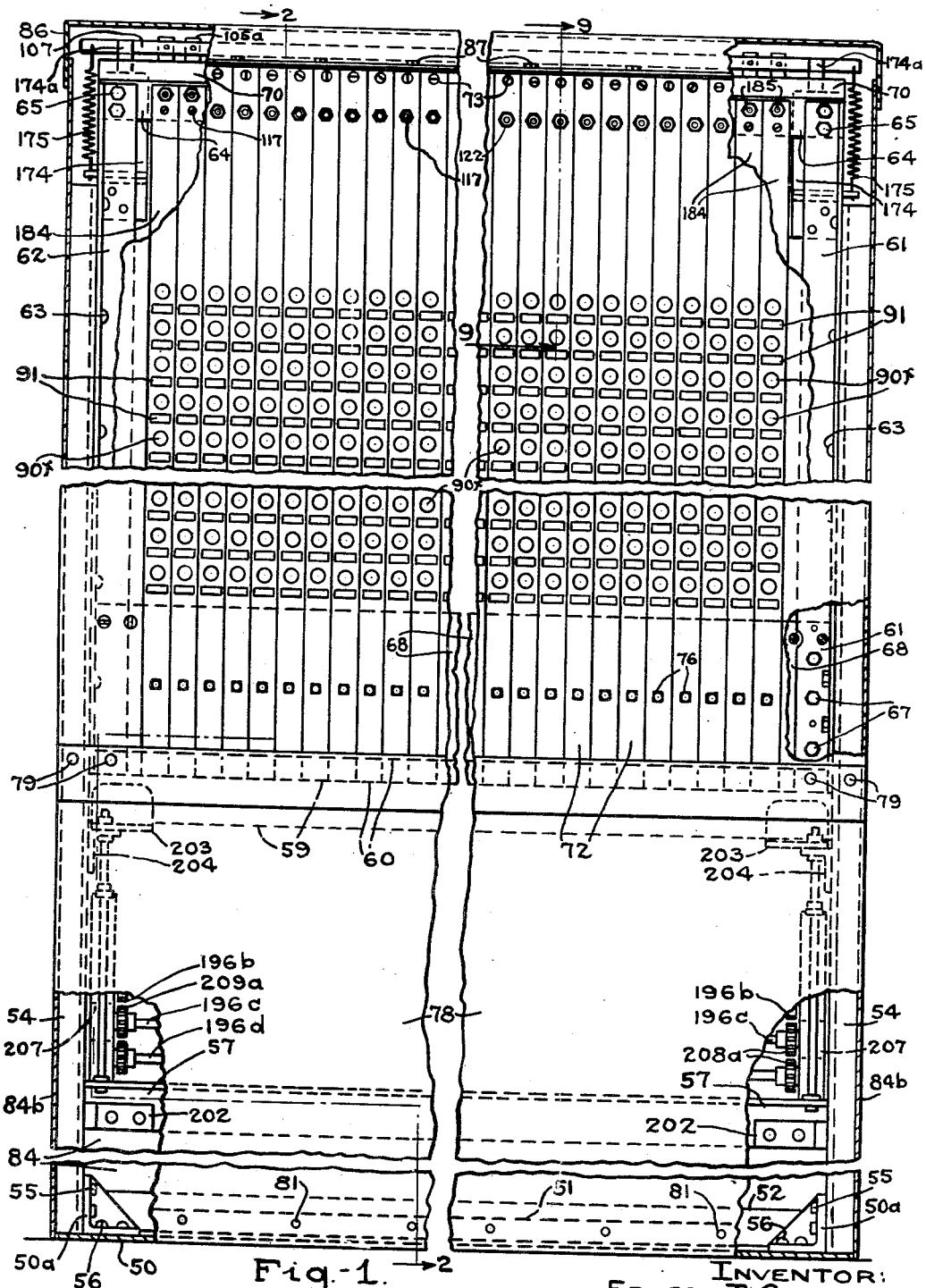

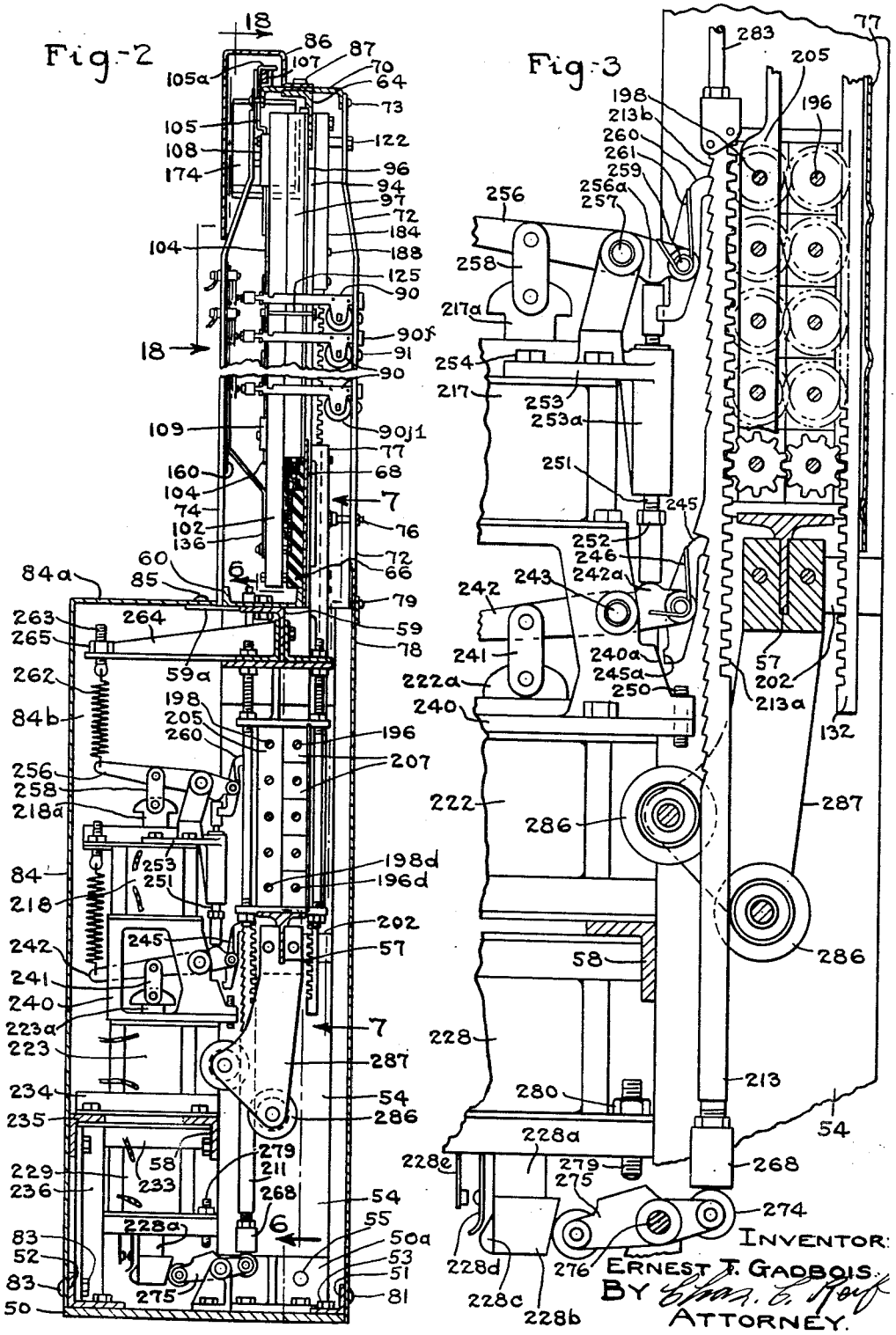

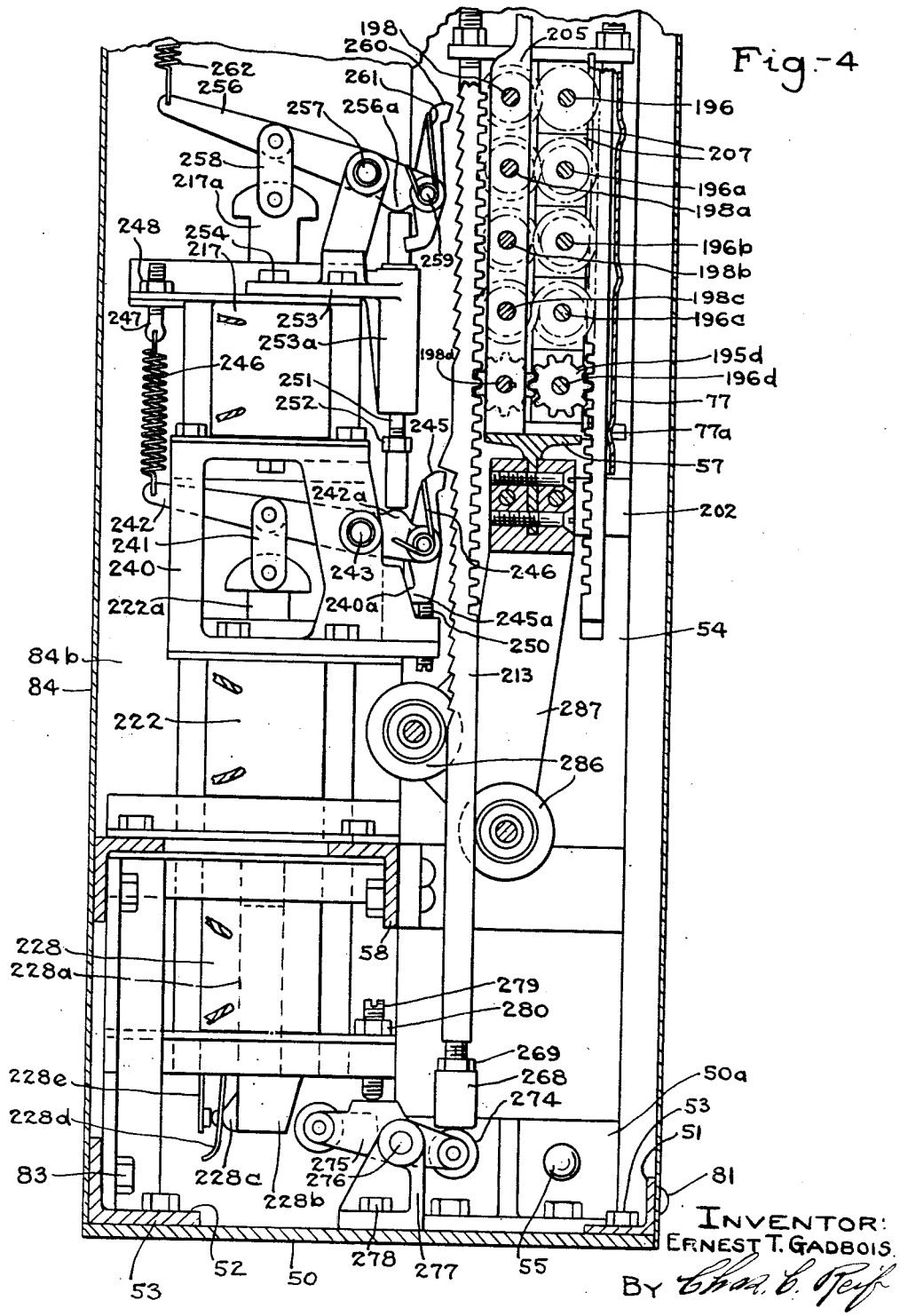

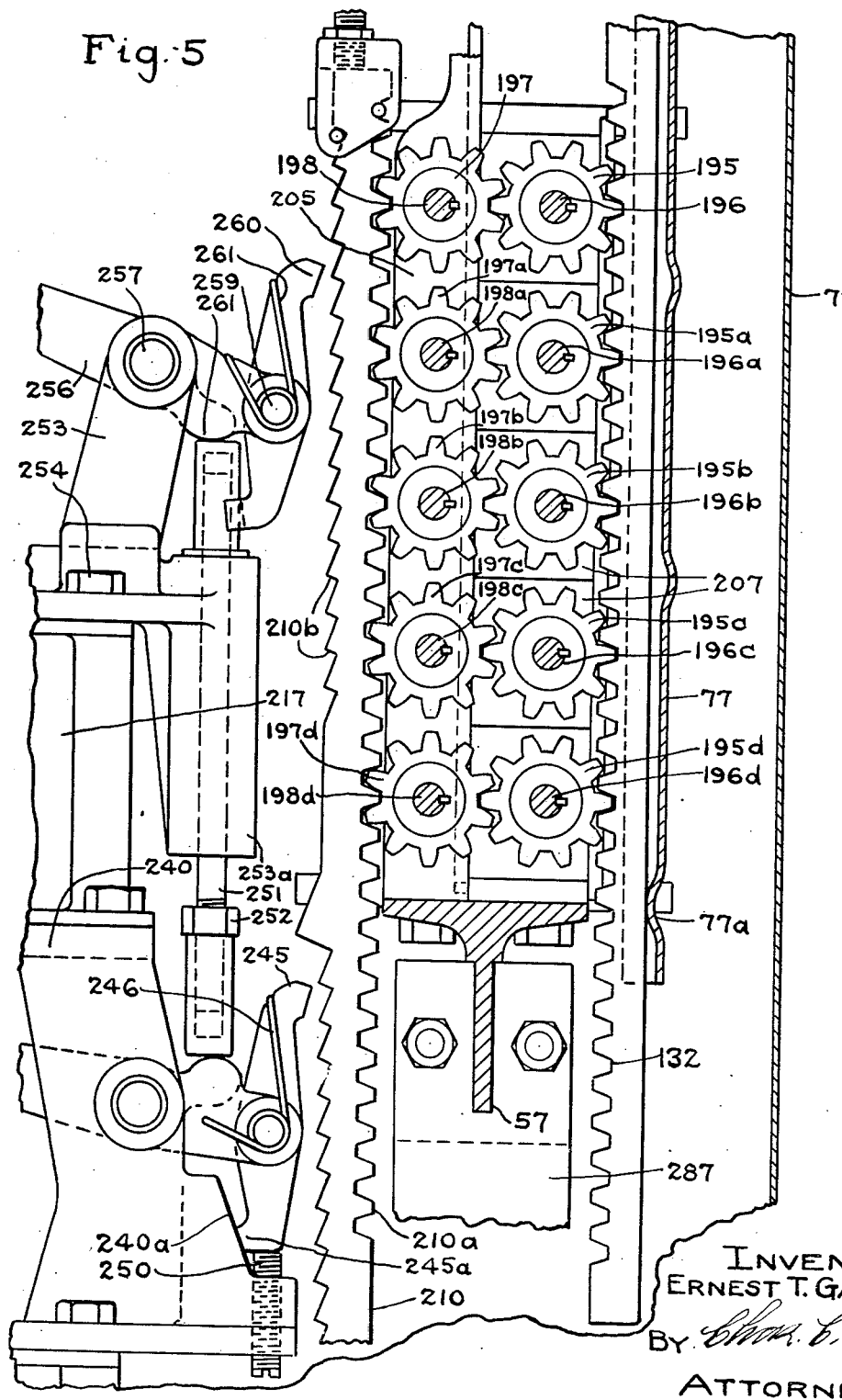

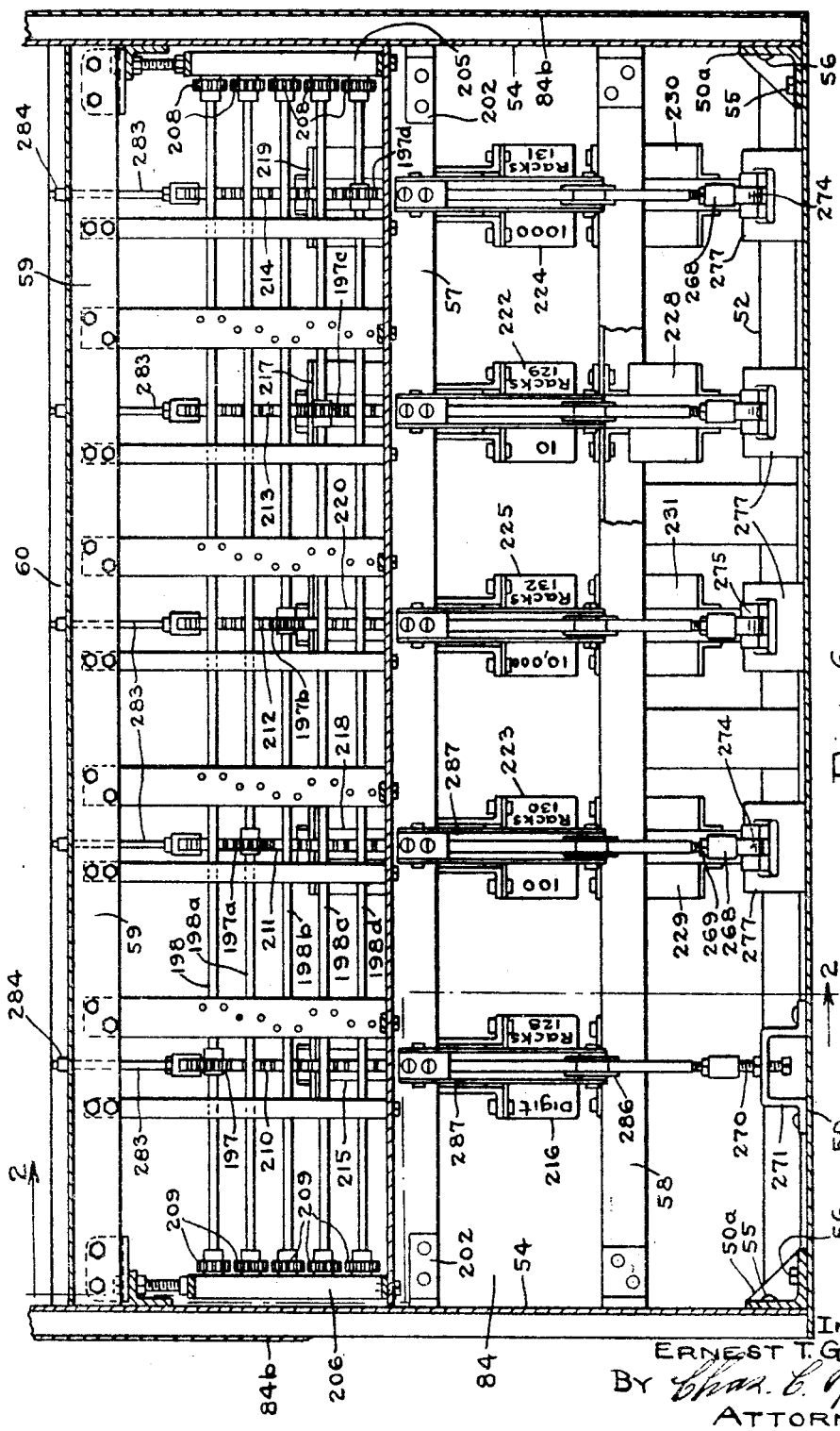

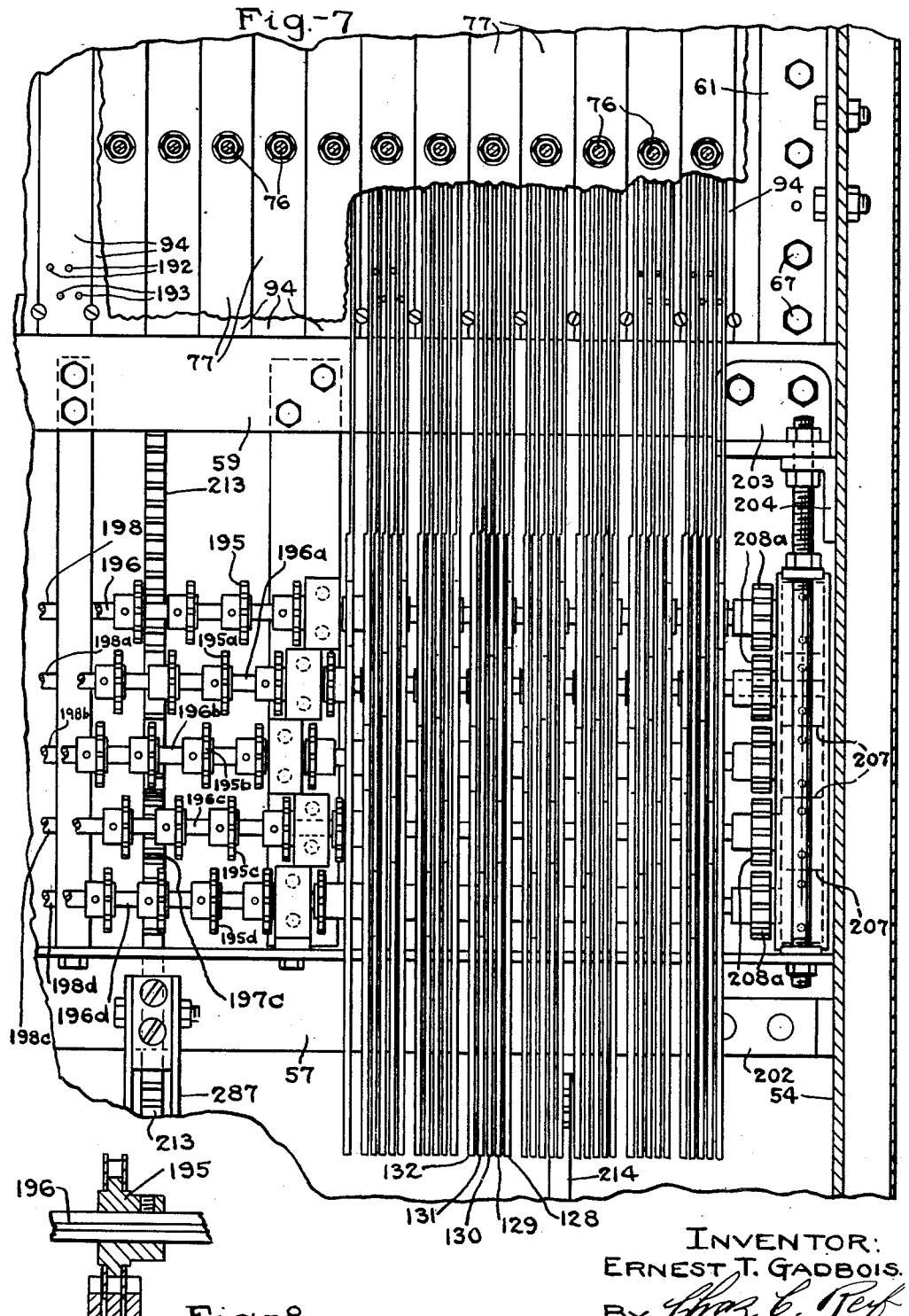

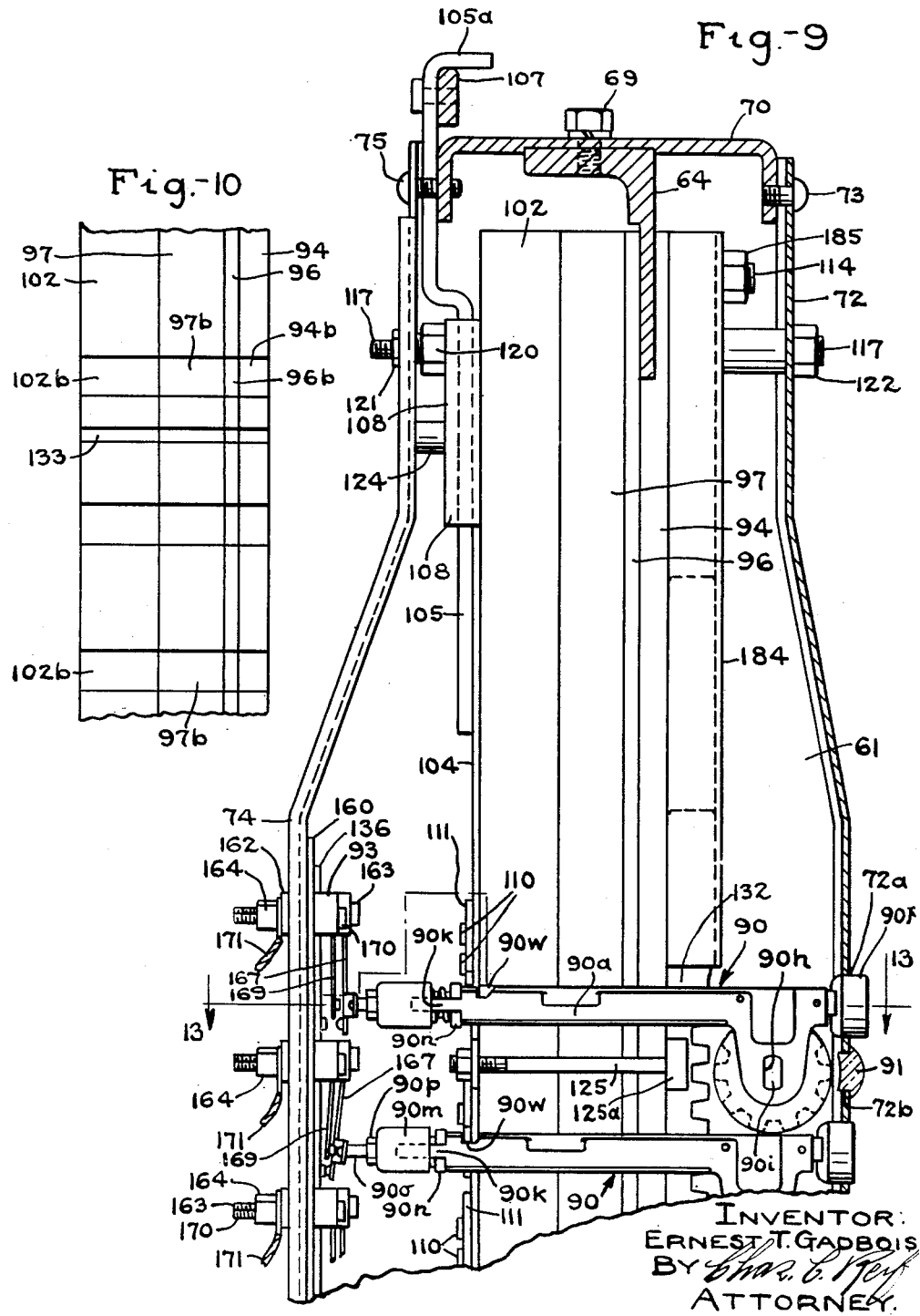

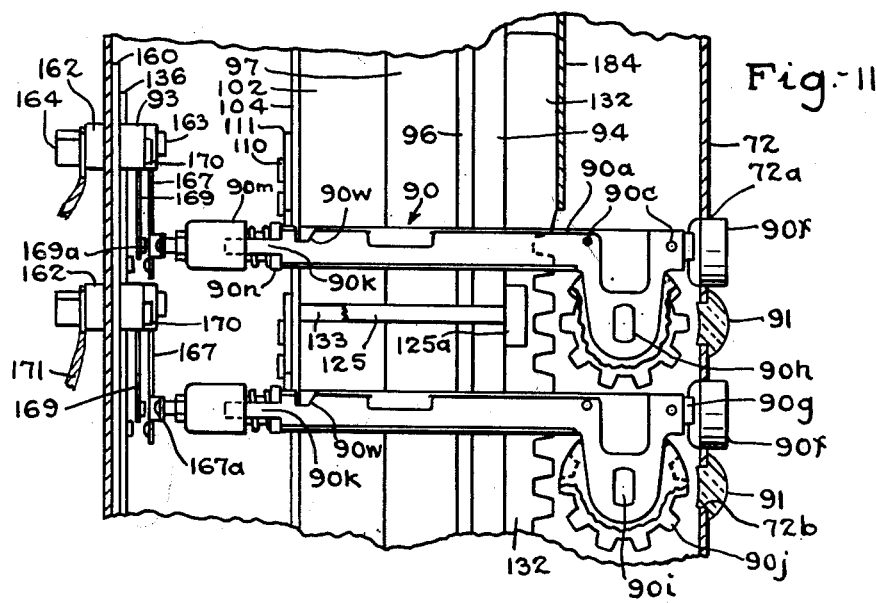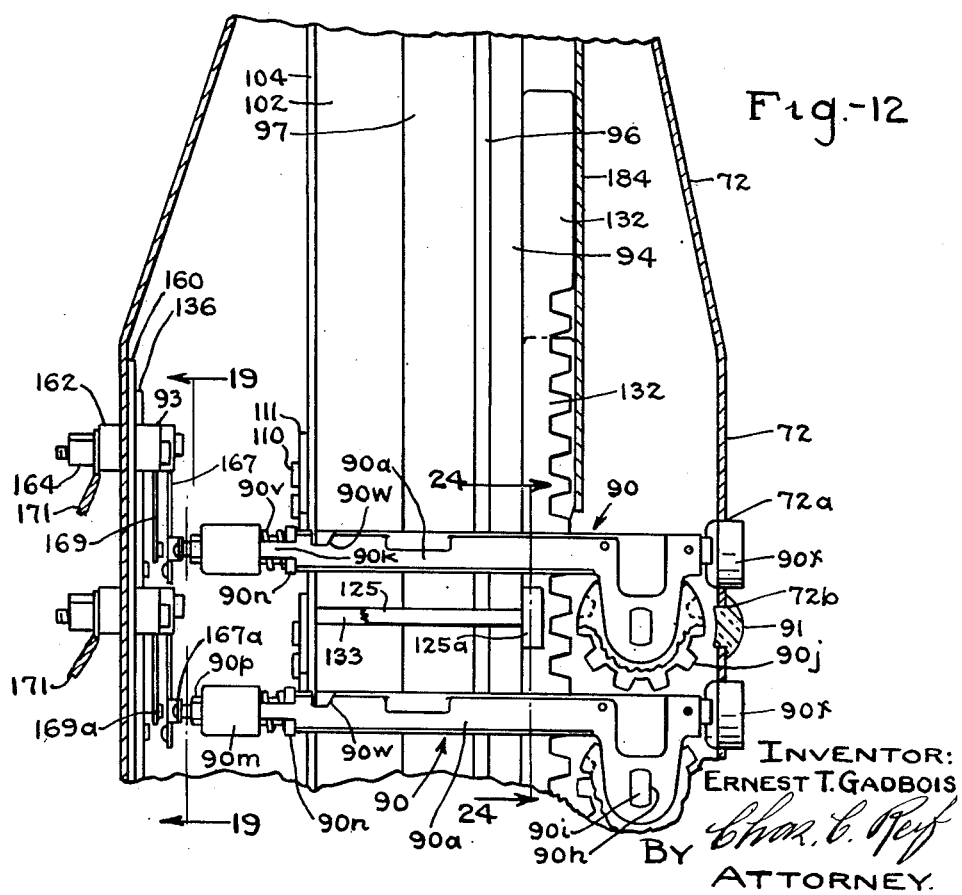

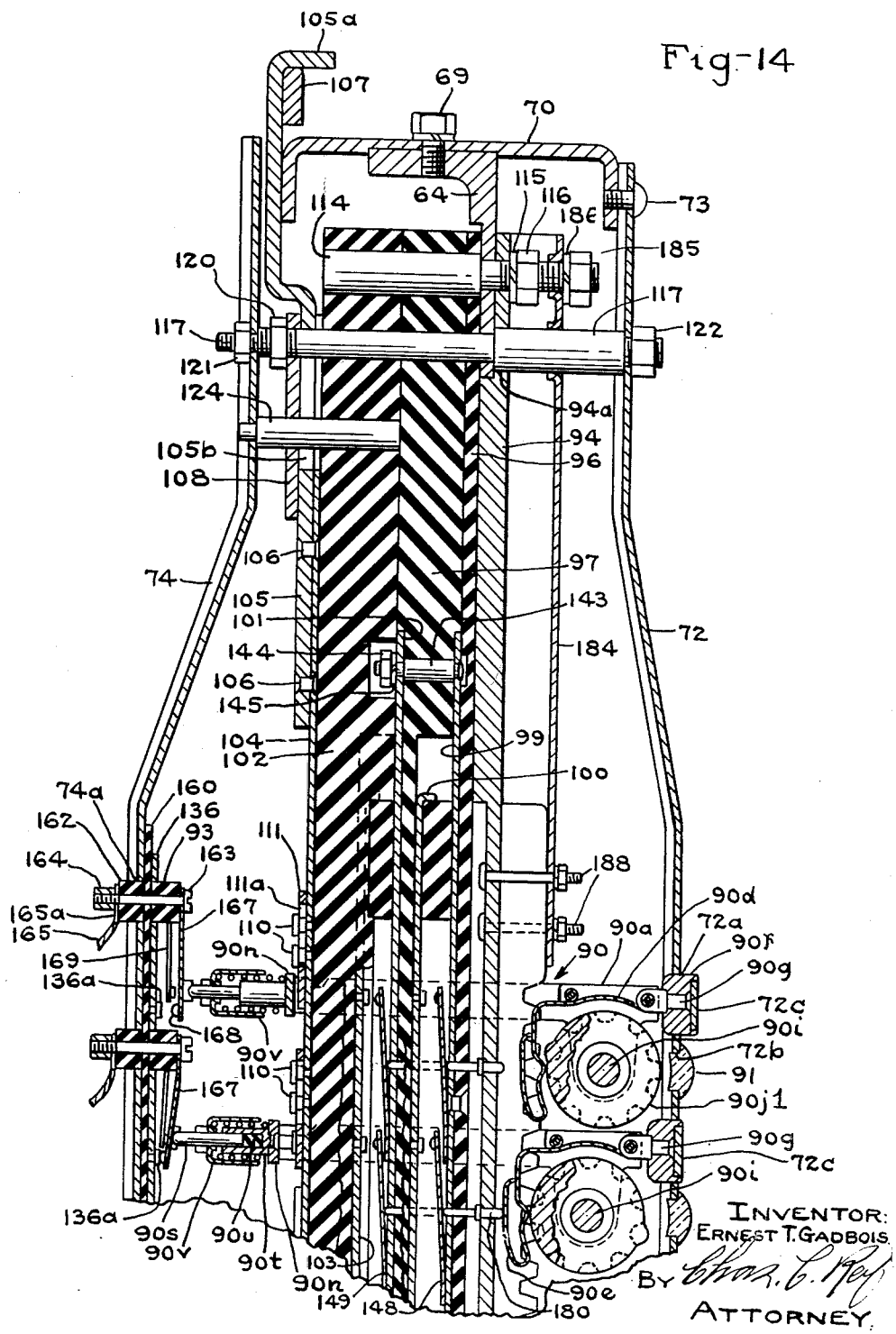

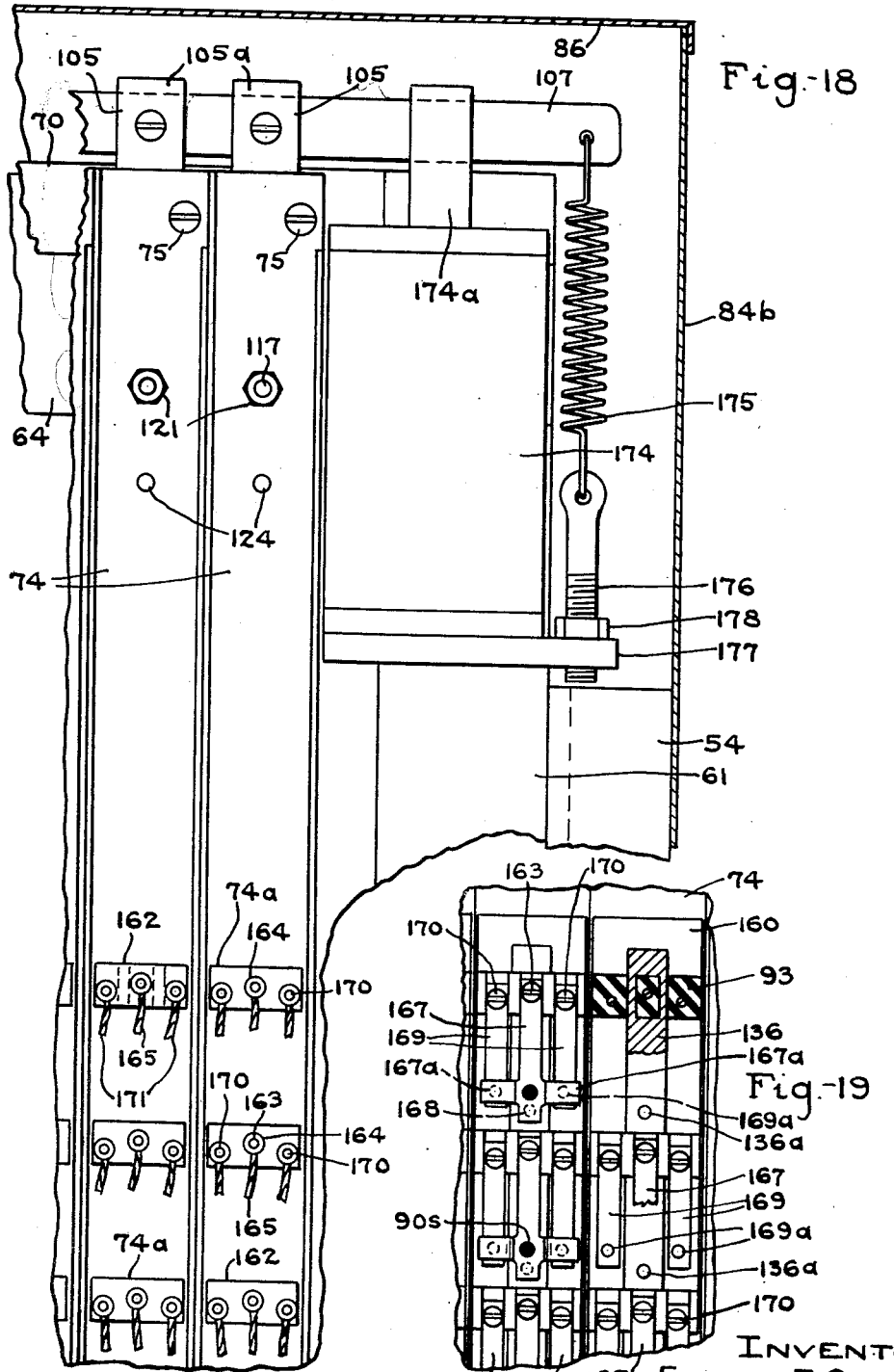

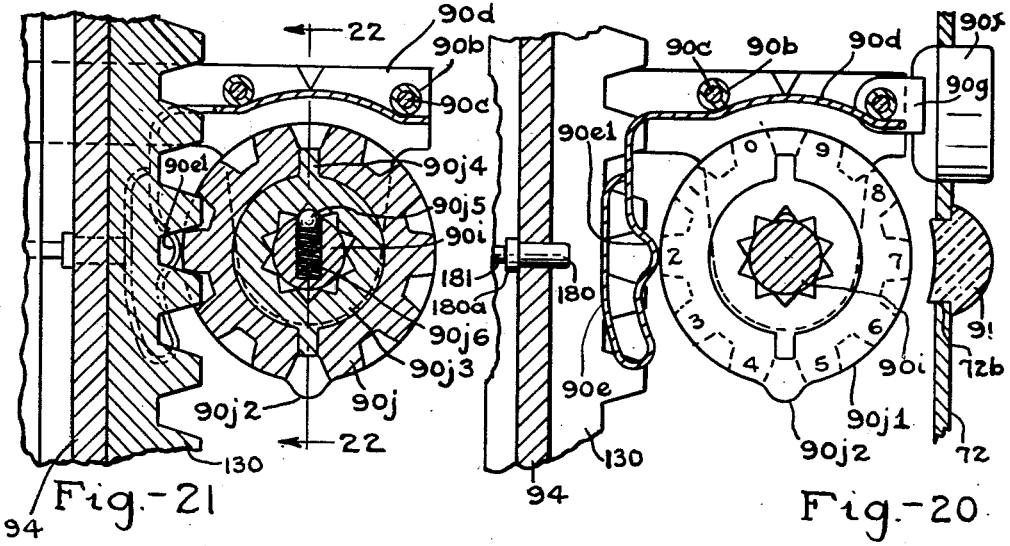
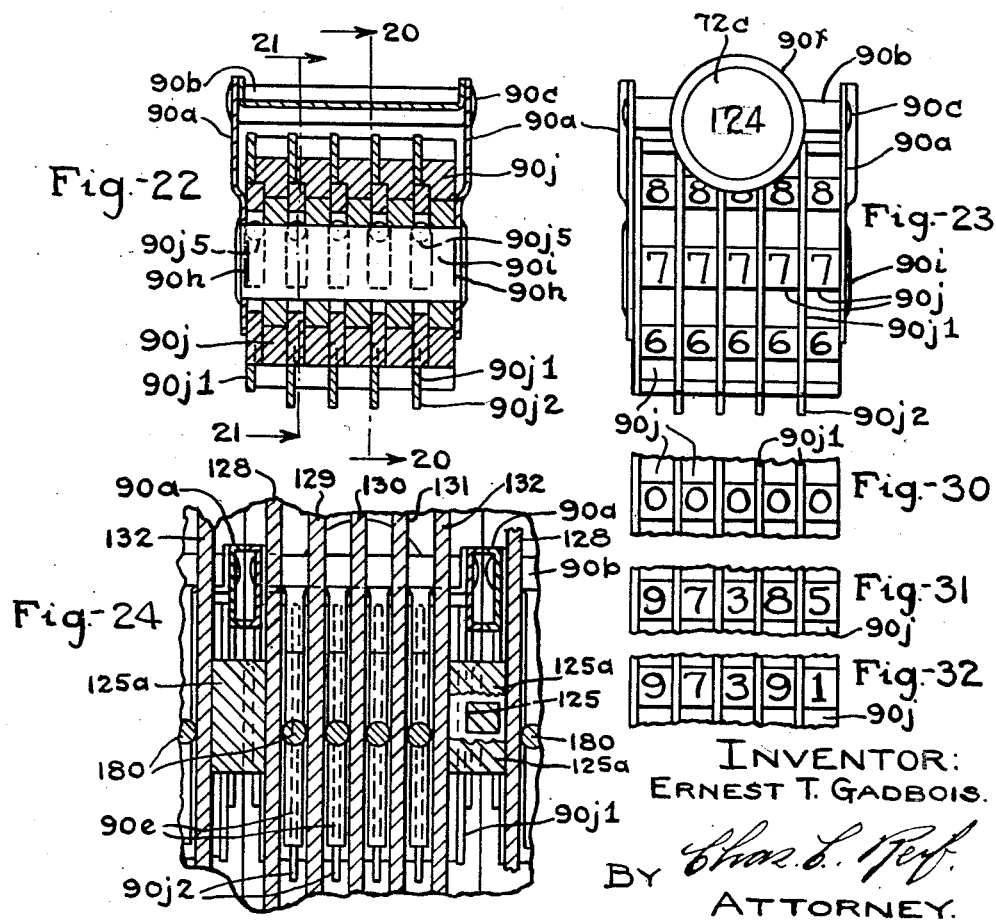

March 29, 1955
E. T. GADBOIS
2,705,107
MULTIPLE TOTALIZER RECORDING AND
DISPLAYING ACCOUNTING MACHINE
Filed Dec. 22, 1949
20 Sheets-Sheet 16
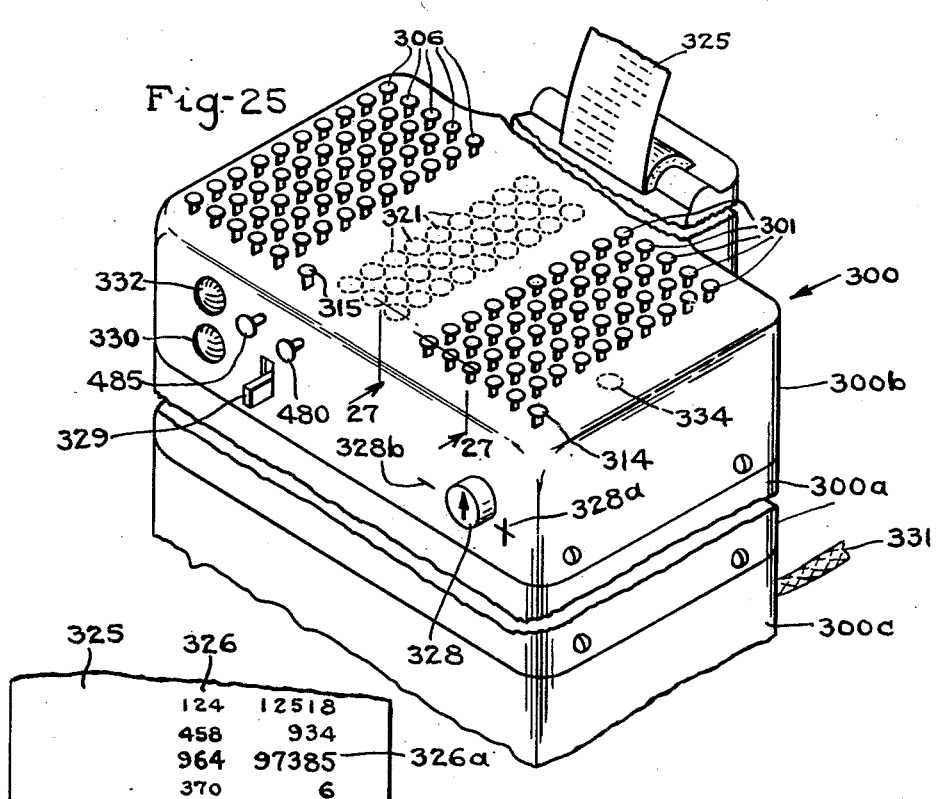
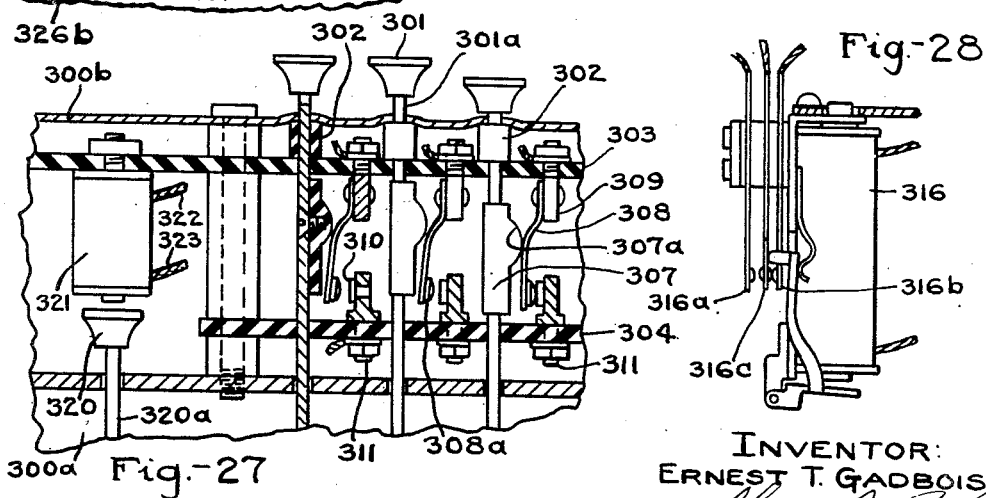
INVENTOR:
ERNEST T. GADBOIS
BY [signature]
ATTORNEY.

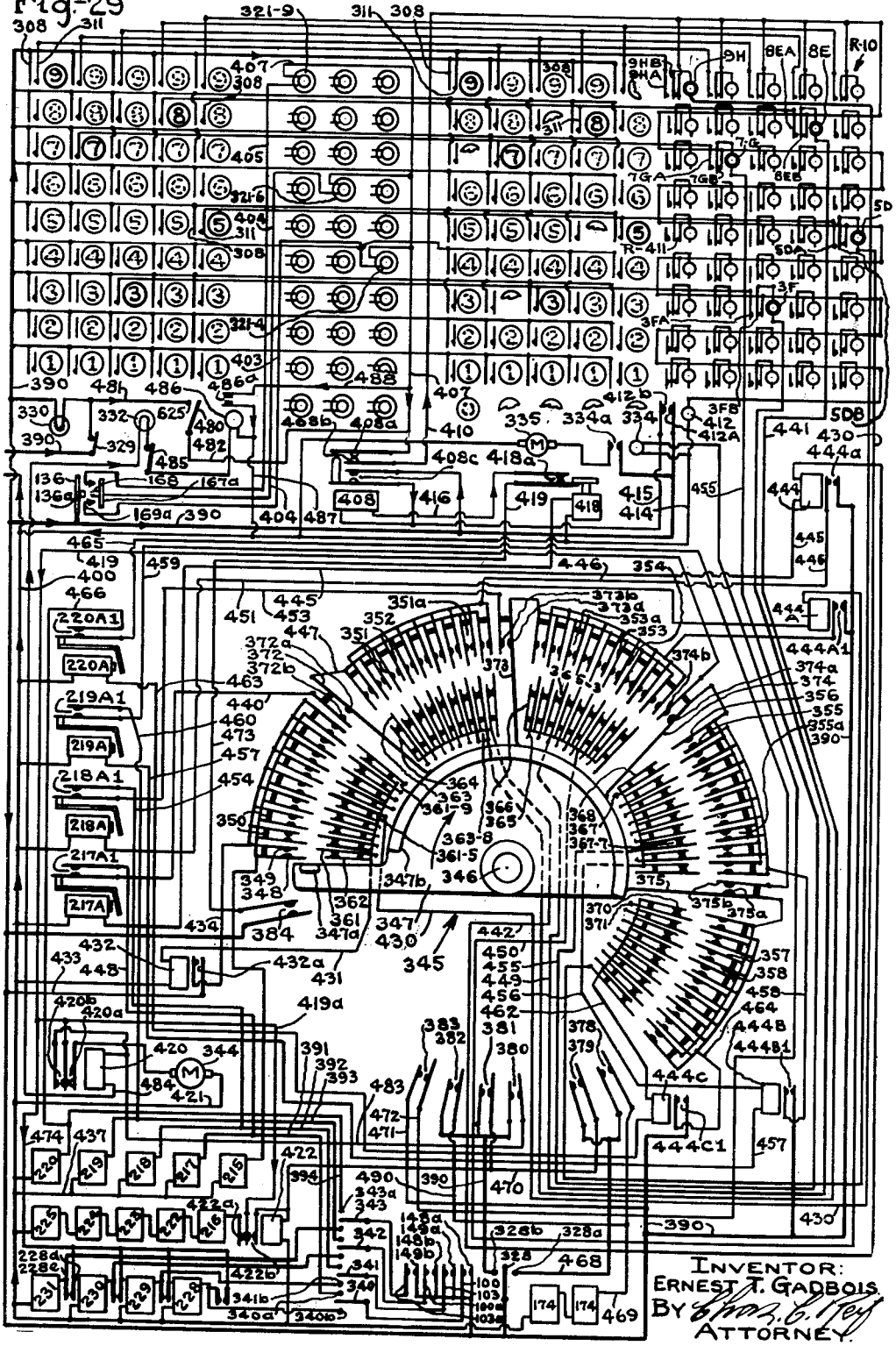

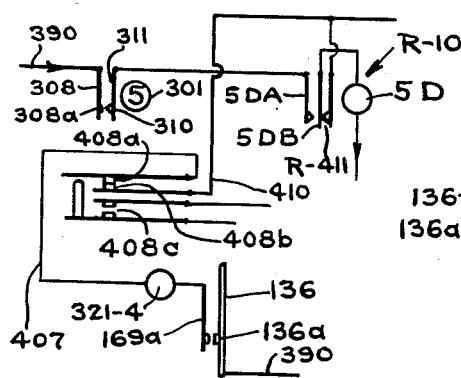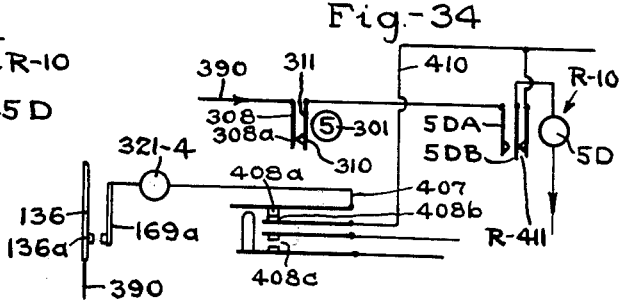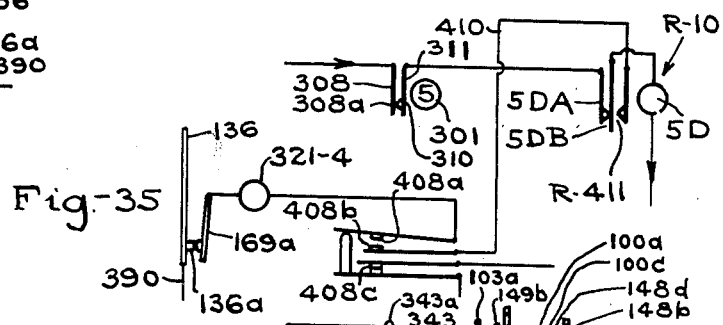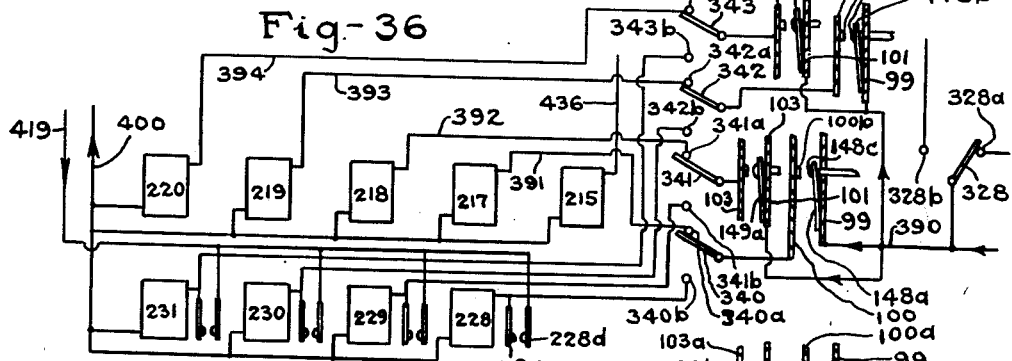

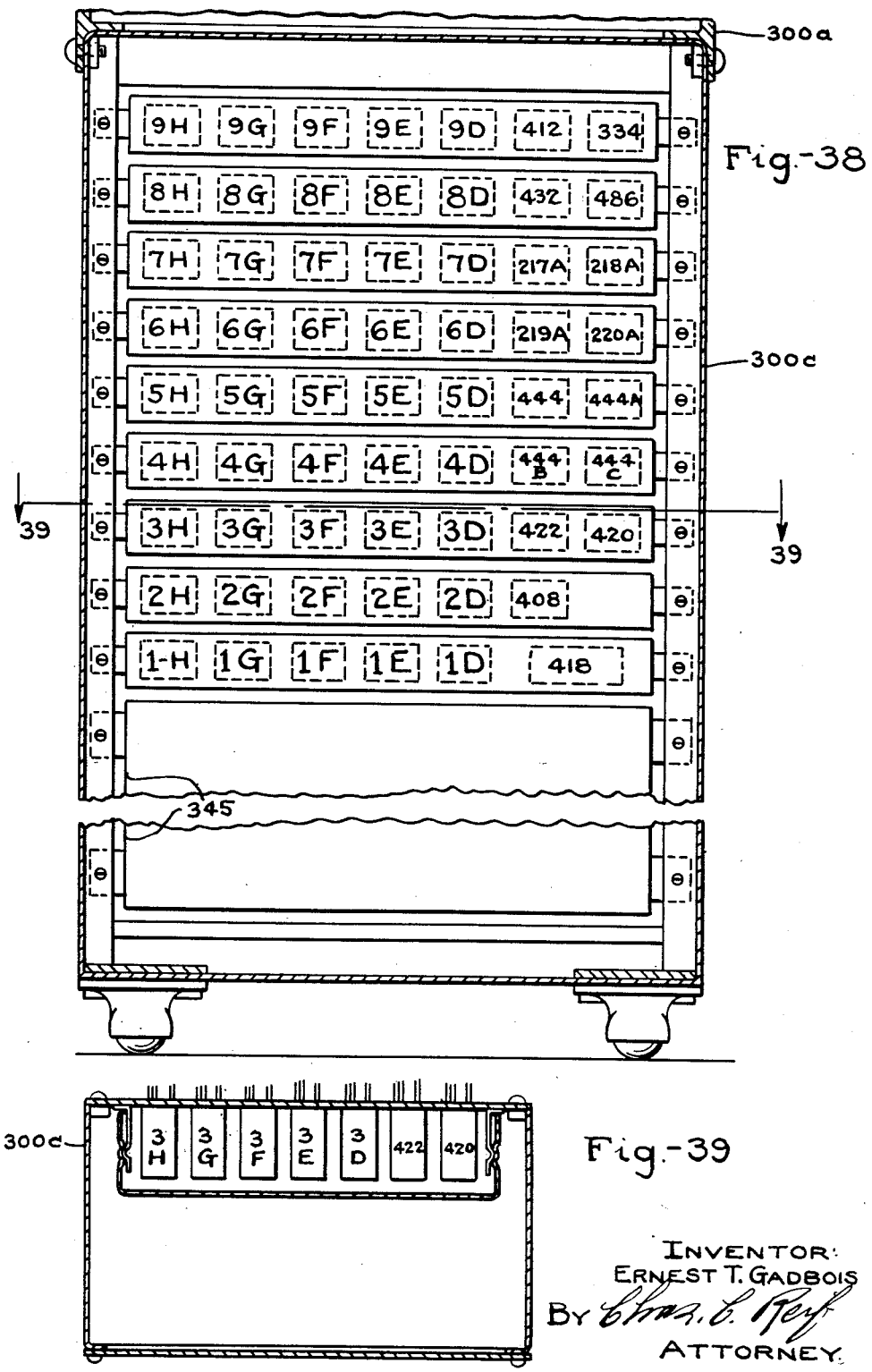

March 29, 1955

E. T. GADBOIS 2,705,107

MULTIPLE TOTALIZER RECORDING AND
DISPLAYING ACCOUNTING MACHINE

Filed Dec. 22, 1949

INVENTOR:
ERNEST T. GADBOIS
BY
ATTORNEY

United States Patent Office 2,705,107
Patented Mar. 29, 1955

2,705,107

MULTIPLE TOTALIZER RECORDING AND DISPLAYING ACCOUNTING MACHINE

Ernest T. Gadbois, Minneapolis, Minn., assignor to Mul-T-Unit Corporation, Minneapolis, Minn., a corporation of Minnesota Application December 22, 1949, Serial No. 134,397

47 Claims. (Cl. 235—61)

This invention relates to a device by means of which certain groups of numerals or other characters can be readily displayed on a display board or panel to show certain sums or other information by operating a keyboard having keys with said numerals or characters on the keys thereof. Such a machine might be called an accounting machine.

It is desirable in many establishments to have inventories of material displayed so as to be readily seen or consulted. It is desirable in other establishments to have the current condition of various accounts displayed so as to be readily seen or consulted. Many other establishments have information involving certain sums which must be kept current and which it is desirable to have conveniently displayed.

It is an object of this invention to provide a device having one or more display panels, each panel comprising a multiplicity of units, each unit including a plurality of members carrying a plurality of numerals or characters thereon, together with means for quickly and conveniently operating said units to display the desired numerals or characters.

It is a further object of the invention to provide such a device as set forth in the preceding paragraph in which each of said units will carry or have associated therewith a code designation which preferably will consist of a group of numerals or letters.

It is another object of the invention to provide a device comprising one or more display panels or boards having mounted thereon a multiplicity of units, each unit comprising a plurality of members carrying thereon a plurality of numerals or characters, one of said numerals or characters being in display position and the characters in display position being in horizontal alinement so that a certain sum or other information is displayed by each unit, said units preferably being arranged in vertical rows, together with an operating means for each row which can move said members of all of the units in said row, together with a control means for each unit for putting said unit in operative relation to said operating means.

It is also an object of the invention to provide a device having one or more display panels having mounted thereon a multiplicity of units, each unit including a plurality of movable members carrying a plurality of spaced numerals or characters, such as the numerals from 0 to 9, said units preferably being arranged in vertical rows, operating means for each row constructed and arranged to move said members of all of said units in said row, a keyboard having rows of depressible keys, the number of rows equaling the number of members in each unit, the keys in each row having thereon the numerals or characters carried by said members respectively, together with electrically operated means between said keyboard and other parts of the device whereby said members will be moved to display the desired sum or information when the proper keys on said keyboard are depressed.

It is a further object of the invention to provide such a device as set forth in the preceding paragraph, said keyboard having two sets of said rows of keys, one set being used when a plus operation is performed or when the number displayed has been increased, as when a number has been added thereto, and the other set of keys being used when said number displayed has been decreased or when a number has been subtracted therefrom. Said sets of keys thus are used respectively for plus or credit transactions and minus or debit transactions.

It is still further an object of the invention to provide such a device as set forth in the two preceding paragraphs, said units each having associated therewith or carrying a code designation such as a group of numerals, and said keyboard comprising a third set of keys comprising several rows, each row having on the keys thereof the numerals of the code designation, together with a tape and printing mechanism operated by said keys so that the number displayed on the display board and the code number of the particular unit may be printed on said tape.

A further object of the invention is the provision of a device comprising a display panel having mounted thereon a plurality of units, each unit including a plurality of members in the form of rotatable wheels carrying on their peripheries spaced characters or numerals, such as the numerals 0 to 9, said units and wheels being arranged in vertical alinement and vertical rows, a plurality of operating members for each of said vertical rows, there being one operating member for each rotatable wheel, together with operating mechanism for moving said operating members vertically to turn said wheels, said last mentioned operating mechanism being electrically actuated, a control member for each unit for placing said unit in operative relation to said operating member, together with a keyboard for controlling and causing actuation of said last mentioned operating mechanism.

It is still further an object of this invention to provide such a device as set forth in the preceding paragraph in which said members constituting rotatable wheels are formed with teeth on their peripheries, and said operating members constituting racks meshing with said teeth.

It is also an object of the invention to provide such a device as set forth in the two preceding paragraphs, actuating racks for said racks, reciprocating pawls for operating said actuating racks and holding pawls for said actuating racks, said pawls being electrically operated, as by solenoids.

These and other objects and advantages of the invention will be fully set forth in the following description made in connection with the accompanying drawings in which like reference characters refer to similar parts throughout the several views and in which:

Fig. 1 is a front elevational view of the parts which make the front panel with corner portions broken away to show other parts of the apparatus;

Fig. 2 is a longitudinal vertical sectional view on line 2—2 of Fig. 1 and Fig. 6;

Fig. 3 is a fragmentary enlarged side elevational view partly in section with some of the parts shown moved by electrical energy to their operating positions;

Fig. 4 is a view similar to Fig. 3, but showing the position of the parts as they will oftentimes appear during the process of subtraction;

Fig. 5 is a full size fragmentary side view similar to Fig. 3, showing the parts in normal non-operating or stopped position;

Fig. 6 is a front elevational sectional view of the lower rear portion of the apparatus taken on the line 6—6 of Fig. 2, showing the arrangement of the power driving mechanism;

Fig. 7 is a front elevational sectional view of the lower front portion of the apparatus taken on line 7—7 of Fig. 2;

Fig. 8 is a detail sectional view through any one of the small pinions shown in Fig. 7;

Fig. 9 is a side elevational view taken on line 9—9 of Fig. 1, showing one of the parts operated, closing a code circuit in either an adding or in a minus operation;

Fig. 10 is a side elevational view of some of the parts shown in Fig. 9;

Fig. 11 is a fragmentary side elevational view similar to Fig. 9, showing the parts in neutral or stop position;

Fig. 12 is a view similar to Fig. 11, showing co-operating parts as they will be positioned when the adding operation is completed or before the last cycle of the subtracting operation is completed;

Fig. 13 is a plan sectional view on line 13—13 of Fig. 9;

Fig. 14 is a vertical sectional view on line 14—14 of Fig. 13;

Fig. 18 is a rear view taken on line 18—18 of Fig. 2, showing the detail structure of each rear top corner of the apparatus;

Fig. 19 is a vertical plan and part sectional view on line 19—19 of Fig. 12;

Fig. 20 is a detail sectional view on line 20—20 of Fig. 22, showing the parts in neutral or stop position;

Fig. 21 is a detail sectional view on line 21—21 of Fig. 22, showing the parts in operating position;

Fig. 22 is a detail sectional view on line 22—22 of Fig. 21;

Fig. 23 is a front elevational view of the numbering wheel as assembled to form a unit;

Fig. 24 is a rear sectional view on the line 24—24 of Fig. 12;

Fig. 25 is a perspective view of the machine that will be used for adding and subtracting numbers by the operator;

Fig. 26 is a fragmentary piece of the paper tape with the amounts subtracted, the code numbers and the amount added shown thereon;

Fig. 27 is a sectional view through a portion of the machine shown in Fig. 25, and taken on line 27—27 of Fig. 25;

Fig. 28 is a side view of one form of electrical relays that will be used in the electrical system;

Fig. 29 is a proposed electrical diagram of the entire combination that will be described in the following specifications;

Figs. 30, 31 and 32 are fragmentary illustrative views showing the numbering wheels in various reading positions;

Figs. 33, 34, 35, 36 and 37 are fragmentary wiring diagrams illustrating various open and closed circuits in the electrical system;

Fig. 38 is a view in vertical section of portion 300c showing the arrangement and mounting of solenoids;

Fig. 39 is a horizontal section taken on line 39—39 of Fig. 38 as indicated by the arrows;

Figure 15:
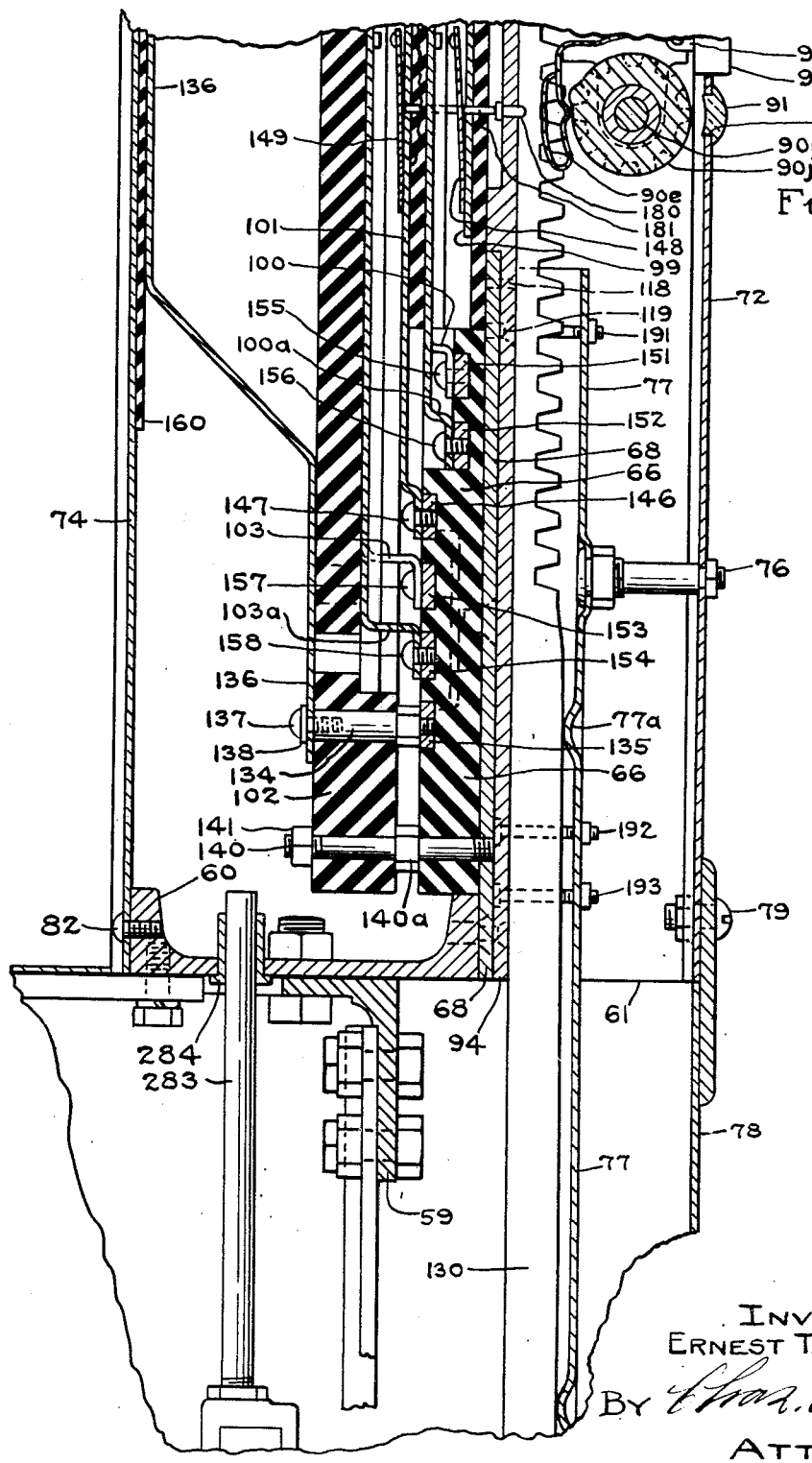
Fig. 15 is a vertical sectional view through the bus bar board and is a continuation of view shown in Fig. 14.

Referring to the drawings, a device is shown having as one main part thereof a display board or totalizing unit, together with the operating mechanism therefor. Said unit has a frame comprising a base illustrated as in the form of a plate 50 preferably made of metal, such as steel, said plate being substantially rectangular in plan. Secured at each side of plate 50 are angle brackets 51 and 52 secured in any suitable manner, as by the bolts 53. Secured to brackets 51 and 52 respectively and extending vertically are side channel standards 54. Channels 54 are secured by bolts 55 to the brackets 50-A which are retained to base 50 by rivets 56. Transversely extending tie members 57, 58 and 59 are secured to a flange of channels 54 in any suitable manner, as by being welded or bolted, thus forming a main frame. An upper sub-frame is provided consisting of left-hand and right-hand vertically extending side angle mmebers 61 and 62, the same being respectively secured by rivets 63 to the frame channel members 54. Members 61 and 62 are also secured to a top transversely extending angle member 64 (see Figs. 1 and 9) by bolts 65 and are also secured to the ends of a bus bar retaining or mounting plate 66 by bolts 67. Said members 61 and 62 are also secured to a transversely extending vertical plate 68 and to member 60 by bolts 67. The transversely extending angle member 64 has bolted thereto by the bolts 69 a top channel member 70 having its flanges directed downwardly which acts to re-inforce the top of the frame and is also used for supporting individual board face sections 72 of a panel board, said sections being secured in any suitable manner, as by the machine screws 73. Channel 70 also supports back sections 74 of the panel board by the screws 75. The lower ends of the panel or board face sections 72 are supported by spacer bolts 76 which in turn are rigidly secured to individual rack bar guide housings 77 which extend vertically and will be later more fully described. The lower edge surfaces of said panel sections 72 abut the upper edge surfaces of a lower front cover plate 78 which is secured in position by means of headed bolts 79. Cover plate 78 extends to the bottom edge of base member 50 and is secured to the angle 51 by a plurality of screws 81. The rear sections 74 extend rearwardly at an angle for some distance and then again extend vertically and are secured at their lower ends in any suitable manner to the transversely extending channel member 60, as by the screw bolts 82.

The rear lower portion of the unit opposite the front lower cover plate 78 is covered by a housing 84 which is secured at its lower end to angle member 52 in any suitable manner, as by the rivets 83. Said housing has a horizontally extending top portion 84a which is secured in any suitable manner, as by the rivets 85, to extensions 50a of channel member 59. Housing 84 is provided with end plates 84b. Parts of the operating mechanism project above channel member 70 and such parts are enclosed by a casing or housing 86 which is secured to channel member 70 by bolts or screws 87.

The front panel or board sections 72 will now be described in more detail. Each panel section is of channel shape in cross section, as shown in Fig. 13, to give the necessary strength and rigidity. Each of said sections is provided with an aperture 72a adapted to receive push buttons 90f forming part of a totalizer unit designated in its entirety as 90. Said sections are also provided with apertures 72b adapted to receive a member 91 of transparent material, such as glass. The rear sections 74 have apertures 74a therein adapted to receive electrical terminal blocks 93. The detailed structure of the units 90 and associated parts are best shown in Figs. 2, 9, 13, 14, 16, 18. The sections 72 and 74 at the front and rear are respectively positioned in perfect alinement forwardly and rearwardly. These sections form individual front and rear covers which can be removed and which provide convenient means for assembling the parts which lie therebetween. The term "panel section" will herein be used to comprise the front and rear sections, together with the parts that are assembled within or between said sections. It will be understood that the number of panel sections 72 will determine the number of totalizing units 90. Thus a board or panel having mounted thereon one thousand totalizer units would in my design comprise forty sections, each section having therein in a vertical row twenty-five such units.

The parts which are mounted between the front and rear panels 72 and 74 include an alinement plate 94 (see Figs. 13 and 14). The non-conductive retainer bars adapted to have mounted thereon electrical conductor strips and contact fingers are provided, the front one of which 96 engages the rear side of plate 94, which plate 94 is of channel shape in cross section. The middle retainer bar 97 is shown in cross section in Fig. 13 and in vertical section in Fig. 14. This bar is provided with a recess between the side portions or flanges thereof which latter engage the bar 96. The bar 96 has mounted thereon a conductor strip 99. A pair of conductor strips 100 and 100a, are disposed in grooves in bar 97. Bar 96 separates and insulates strip 99 from bar 94. Bar 97 is also provided with a recess rectangular in transverse cross section on its rear side in which is disposed the electrical conductor strip 101. The third or rear retainer bar 102 has side portions which engage the rear side of bar 97 and plate 101. Each bar 102 has a recess therein accommodating certain contacts on bar 101 to be later described, which recess has spaced channel portions 102a in which are disposed the contact strips 103 and 103a respectively. In the rear of the rear bar 102 and engaging the same is a longitudinally extending metal bar 104. Each bar 104 is secured to a plate 105 in any suitable manner, as by the rivets 106. Plate 105, as shown in Figs. 2 and 14, extends above and at the rear side of channel member 70 and has a top portion 105a bent forwardly. A bar 107 extends across the machine and is disposed beneath the portions 105a of the plates or bars 105. U-shaped guide members or housings 108 and 109 are secured to rear retainer bar 102 and act as guides for bars 105. The plates 104 have secured therein spaced headed studs 110 which have intermediate portions extending through elongated slots 111a in keys 111 to be later described. It will be noted that the retainer bars 94, 97 and 102 extend substantially the full length of the panel sections 72, as shown in Figs. 14 and 15. Said retainer bars are rigidly secured at their upper ends to the top angle members 64 and at their lower ends to the transversely extending plate 68.

It is necessary that the parts 94, 96, 97, and 102 be assembled and retained in perfect alinement and that the co-operating parts assembled therewith be likewise retained in perfect alinement. For this purpose alinement dowels are used, some of which also serve as clamping or securing bolts. In each section the alinement plate 94 is attached to the top angle 64 by means of the dowel bolt 114 and the standard lock washer 115 and nut 116. It will be seen that bolt 114 has a uniform diameter where it extends through members 96, 97 and 102 and is provided with a shoulder engaging angle 64. Below bolt 114 a reamed aperture 94a is formed in alinement with plate 94 and a dowel bolt 117 extends through said aperture and through a reamed aperture in angle 64 thus keeping plate 94 accurately in position. Plate 94 is also secured to plate 68 by means of a dowel 118 and countersunk machine screws 119. The dowels 117 have a uniform diameter extending through retainer bars 96, 97 and 102 and the same is provided with a nut 120 engaging guide housing 108. Dowel 117 has a reduced threaded portion extending through the rear panel 74 which is clamped against the shoulder formed by said reduced portion by a nut 121. Dowel 117 also has a reduced threaded portion at its front extending through front panel 72, which panel is clamped against the shoulder formed by said reduced portion by a nut 122. Another dowel 124 is fitted in rear retainer bar 102 and has a uniform diameter extending therethrough and through guide housing 108, the same having a reduced portion fitted in an accurate aperture in rear panel 74. With said described construction it will be seen that the parts 94, 96, 97 and 102 are very accurately positioned in vertical alinement. It will be noted that bar 105 is provided with an elongated slot 105b through which dowels 117 and 124 pass. Said slot and dowels constitute a guide means for bar 105. Said parts 94, 96, 97 and 102 are further rigidly clamped in position by spaced lock bolts 125. (See Figs. 9, 10, 11, 12 and 24.) Lock bolts 125 fit in square grooves 133 of bars 94, 96, 97 and 102. Said bolts 125 also have a specially shaped head 125a which has the additional function of forming a longitudinal sliding guide and spacer for the outer rack bars 128 and 132. There are five racks arranged side by side, namely racks 128, 129, 130, 131 and 132, as shown in Fig. 10, to which reference will later be made. Before the members 94, 96, 97 and 102 are clamped together by the bolts 125, the rear retainer bar 102 is positioned over a post 134 adjacent the lower end of said bar. Bolt or post 134 has a nut-like enlargement disposed between bars 66 and 102 and has a reduced threaded portion threaded into a bus bar 135 disposed in bar 66. Said post 134 has a rear end engaging the lower end of another common conducting bar 136 and is clamped to said bar by a headed screw 137 having a washer 138 beneath the head thereof. Bars 135 and 136 are thus connected. Said bar 102 is also fitted over another bolt 140 which extends therethrough and to which said bar is clamped between a nut-like intermediate enlargement 140a on said bolt and the nut 141. Bolt 140 extends through bar 66 and has an inner threaded end threaded into plate 68. Bar 102 is thus firmly secured and positioned at its lower end in proper spaced relation to bar 68.

As above stated and as shown in Fig. 13, the retainer bars 96, 97 and 102 are provided with recesses or longitudinally extending milled grooves for receiving the conductor strips or copper bus bars disposed therein. The conductor strip 99 which could be called a common bus bar or conductor strip starts at its lower end, as shown in Fig. 15, a short distance above the top of plate 68 and extends upward in its groove in retainer bar 97 and is connected by a bolt 143 to the common conductor strip 101 which, as above stated, is disposed in a groove in retainer bar 97. Bolt 143 is riveted into strip 99 at its front end and has a reduced threaded portion extending through strip 101 at its rear end and is clamped against said strip by a nut 144 beneath which is a spring washer 145. Strip 101 extends downwardly in its groove to a bus bar 146 to which it is secured by the screw 147. The conductor strips 99 and 101 each have attached thereto a plurality of duplex contact fingers or members 148 and 149 respectively which extend longitudinally in the grooves of said strips. (See Figs. 13 and 14.) Conductor strip 99 has the portions 148a and 148b while conductor 101 has the portions 149a and 149b, as shown in Fig. 13. The strips 100 and 100a have carried thereon and secured thereto respectively contact members or portions 100b and 100c. Strips 148a and 148b have secured thereto and carried thereon contact members 148c and 148d. From Fig. 13 it will be seen that said contacts 148c and 148d of bar 99 will engage contacts 100b and 100c of bars 100 and 100a, and contacts on fingers 149a and 149b of bar 101 will engage contacts of bars 103 and 103a at certain times. The strips 100 and 100a and 103 and 103a are retained at their upper ends by retainer blocks 150 (see Figs. 14 and 16) as well as being pressed into the grooves in which they are disposed. Said strips 100, 100a, and 103 and 103a extend down to bus bars 151, 152, 153, and 154 respectively, to which they are secured by screws 155, 156, 157 and 158 respectively (see Fig. 15), which bus bars are assembled in plate 66. Conductor strip 136 already referred to has contact points 136a thereon and this strip extends downwardly from post 93 against an insulating strip 160 which is disposed against the inside face of rear panel 74. It will be noted that post 93 already referred to extends through an aperture in bar 136 and seats against insulation strip 160. Another block or post 162 is disposed at the other side of insulating plate 160 and a headed bolt 163 extends through members 93, 160 and 162, the same having on its outer end a nut 164 which holds the terminal 165a of a conductor 165 against block 162. Disposed under the head of bolt 163 and against the inner side of block or post 93 is a contact strip 167. (See Figs. 14, 16 and 18.) Strip 167 has thereon a contact 168. This is adapted to engage with contact 136a already described. A pair of contact strips 169 are secured to blocks 93 and connected to plate 136 by headed bolts 170 similar to the headed bolt 163 already described. (See Fig. 19.) Strips 169 have thereon contacts 169a respectively adapted to be engaged by laterally projecting portions 167a of contact strip 167, as shown in Fig. 19. The nuts on bolts 170 which are similar to the nuts 164 and are shown in Fig. 18, hold the contact members of conductors 171. The parts 93 and 162 to 171 are duplicated on members 136 and 160 in vertical rows, as shown in Figs. 18 and 19, there being one of said sets for each one of the units 90.

Figure 16:
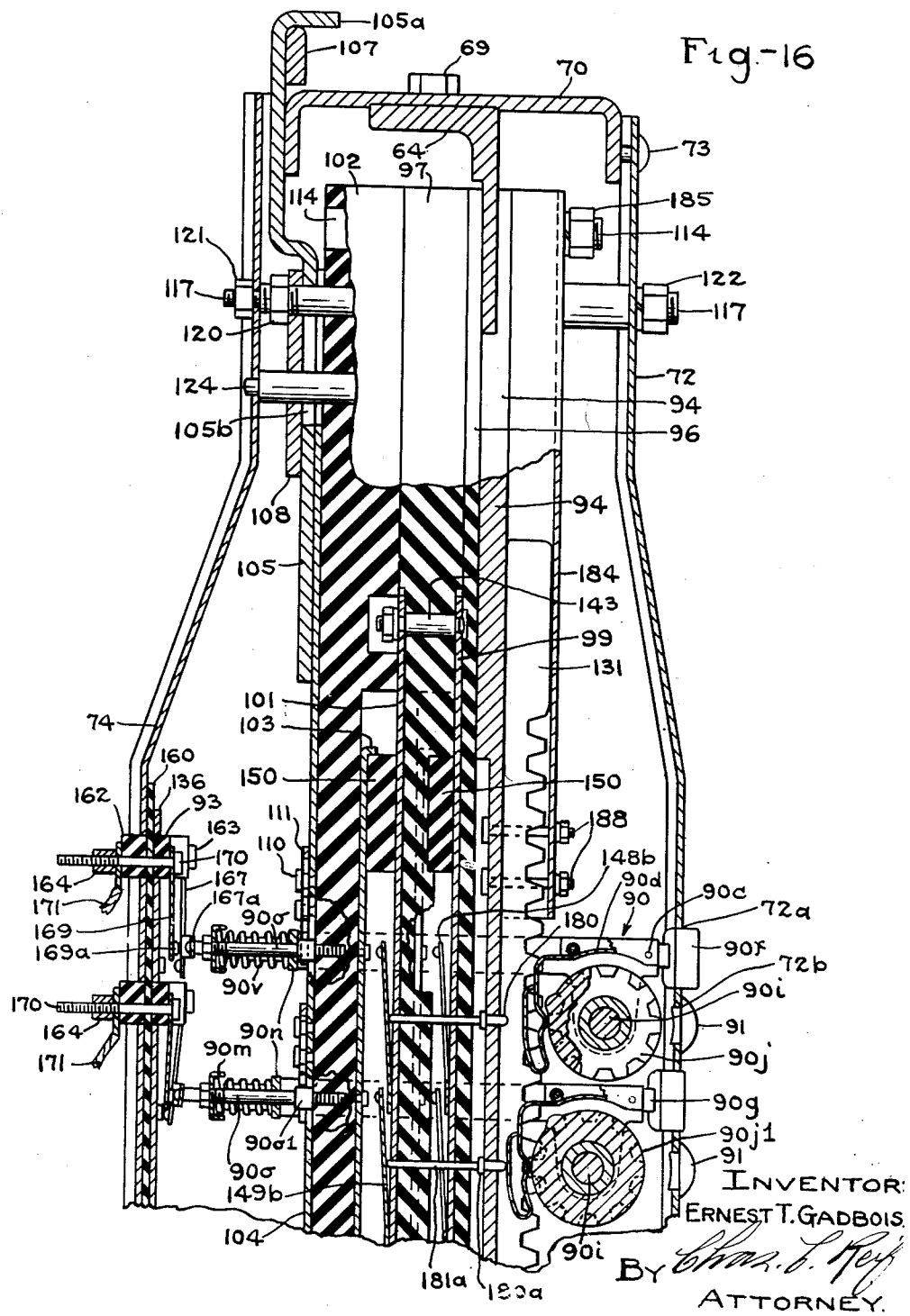
Fig. 16 is a vertical sectional view on line 16—16 of Fig. 13.
Figure 17:
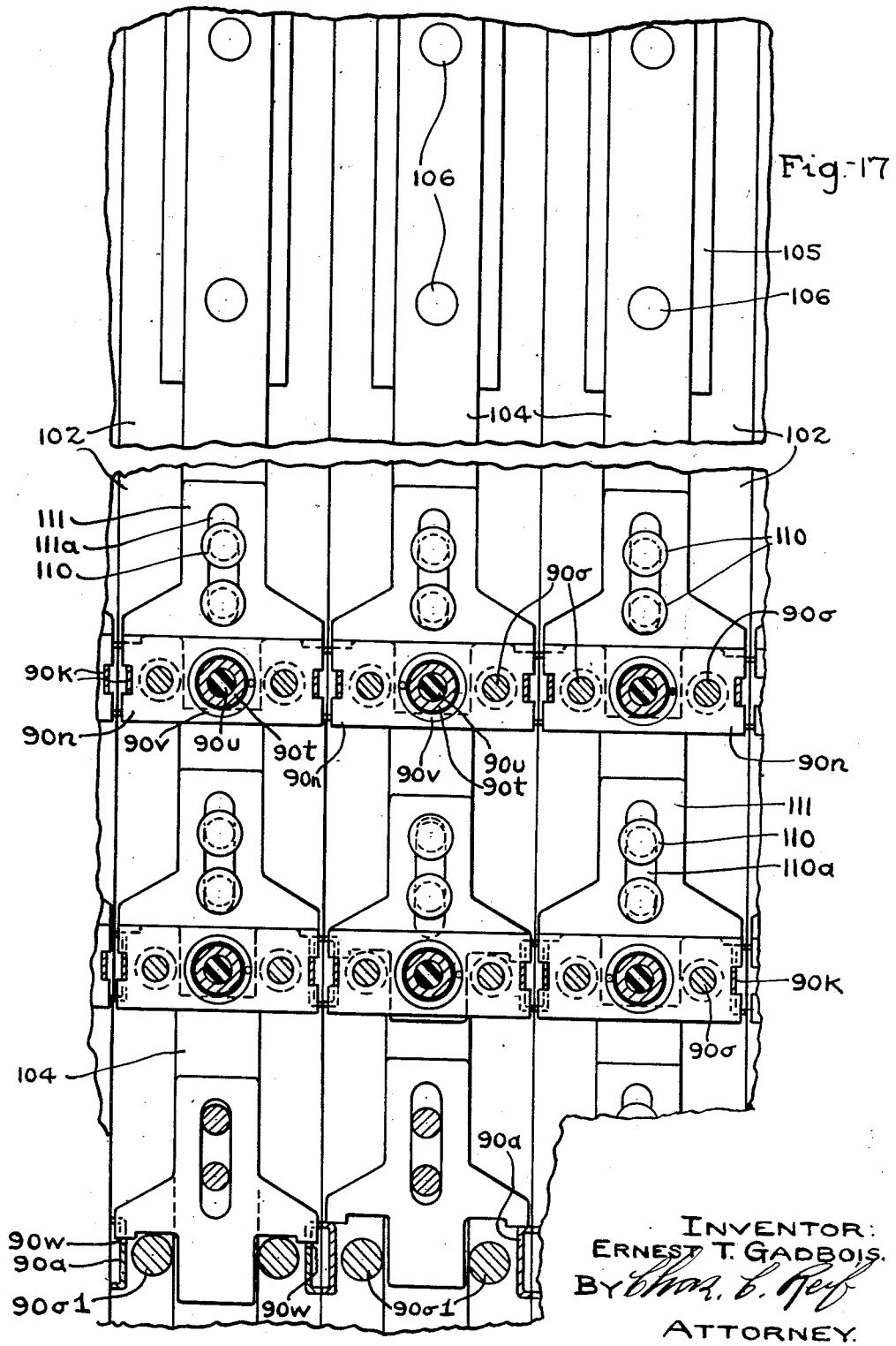
Fig. 17 is a rear view of parts shown in Figs. 9, 11, 12, 14 and 16, as seen from the rear and is taken on line 17—17 of Fig. 13.

Each totalizer unit 90 comprises a frame including spaced side members 90a which have their vertically spaced flanges moving in grooves 94b, 96b, 97b and 102b of the retainer bars 94, 96, 97 and 102. (See Figs. 10, 11 and 13.) The members 98 are flattened at their outer ends and are secured to spacer tubes 90b by a rivet pin 90c. Rivet pins 90c also support a frame member 90d. Frame member 90d has formed integral therewith activator fingers 90e as shown in Fig. 13, and also the push button 90f which is movable through an aperture in the front panel 72, as shown in Figs. 13 and 14. Push button 90f is secured to frame 90d by a rivet stud 90g which is riveted to said push button and has an inner portion apertured to receive one of the rivet pins 90c. The side members or channels 90a have depending portions adjacent their front ends which have rectangular apertures 90h adapted to receive a shaft 90i, which shaft supports a plurality of character or number wheels 90j. (See Figs. 14, 21, 22 and 23.) The side channels 90a are formed with reduced portions 90k adjacent their inner ends which form guide tongues for said members or channels into a U-shaped spring housing member 90m, as shown in Figs. 13 and 14. Said reduced portions also form shoulders for a spring pressure plate 90n. Pressure plate 90n has apertures adjacent each end through which pass guide pins 90o which are threaded at their inner ends in the retainer bars 102. Said pins are provided with enlargements 90o1 adjacent their inner ends, the rear surface of which forms shoulders and these constitute a forward stop for plate 90n. Enlarged portions 90o1 also act as guides for vertically movable plate or bar 104, as clearly shown in Fig. 13. It will be seen that said reduced portions 90k fit in grooves formed in the ends of plate 90n. Pins 90o have nuts 90p thereon at their outer ends, which engage the rear sides of the spring housing 90m. The housing 90m has a central inwardly extending hub through which passes an insulating rod 90s which extends into a tube 90t, which tube is provided with a reduced portion riveted to the pressure plate 90n. Tube 90t contains a yielding or rubber block 90u against which rod 90s engages. A compression coiled spring 90v surrounds tube 90t and rod 90s, said spring surrounding said central hub and engaging housing 90m at its outer end and engaging plate 90n at its inner end. As shown in Figs. 13, 14 and 16, rod 90s is arranged to engage conductor spring 167. The side members 90a are provided with recesses 90w at their upper sides and these when the unit 90 is pushed inwardly are adapted to receive the keys 111. The keys 111, as shown in Fig. 17, have widened portions with downwardly directed ends which are adapted to seat by gravity in the recesses 90w. It will be seen that when the unit 90 is pushed inwardly the recesses 90w come into position so that keys 111 can drop therein. In the lower unit in Fig. 9 keys 111 are shown seated in said recesses. As stated the bars 104 which carry the studs 110 and which studs extend through the slots 111a in keys 111 are secured to plates 105. The bar 107 previously referred to extends across the top of the device and is connected to the core 174a of a solenoid 174, there being one of said solenoids at each end of bar 107, as shown in Fig. 1. It will be seen that when core 174a is raised, bar 107 will be raised and plates 105 will be raised so that all of the keys 111 will be raised. When the solenoids 174 are deenergized, bar 107 will be pulled downwardly by springs 175 secured to the ends thereof respectively and secured at their other ends respectively to eye bolts 176 threaded into a bracket 177 secured to the frame. Bolt 176 is shown as provided with a locking nut 178. When bar 107 is pulled downwardly, the plates 105 and bars 104 can drop by gravity so that the keys 111 are free to drop into the recesses 90w when a unit is pushed inwardly. It will be noted that the fingers 90e forming part of frame 90d extend downwardly at the rear of frames 90d, as clearly shown in Figs. 15, 16 and 20. These depending portions or fingers 90e as illustrated are four in number. Portions 90e also have raised upwardly extending portions 90e1, as shown in Figs. 15, 16 and 20. The fingers 90e are disposed in horizontal alinement with the push rods 180 and 181 which are mounted for sliding movement in the front retainer bar 96. As shown in Figs. 13, 14 and 15, the push rods 180 are in alinement with the contact strips 148 and 148a while push rods 181 are in alinement with the contact strips 149a and 149b.

Referring to Figs. 16 and 20 to 23, it will be seen that the wheels 90j already described have disposed therebetween cam plates or disks 90j1. These disks are shown as having the same diameter as wheels 90j except at one point where a cam projection 90j2 extends from the periphery of said disks. Said projection 90j2 is adapted at times to engage the raised portion 90e1 to push one of the fingers 90e rearwardly to engage one of the steel push rods 180. When the projection or lobe 90j2 engages one of the fingers at 90e1, said finger will be pushed rearwardly and exert pressure against one of the push rods 180 which will be pushed in until the head 180a thereof engages the front of plate 96. The push rods 180 engage non-conductive rods 181 and 181a and not only provide means for engaging the contacts on fingers 148 and 149 with those contacts on strips 100, 100a and strips 103, 103a but they also act as spacers and roller bearings for certain rack bars 128 to 132. The wheels 90j which as stated and shown in Figs. 20 and 23 have characters such as numbers on their peripheries, are made from a pinion which in the embodiment of the invention illustrated have ten teeth. The outside diameter of the pinion is cut down to the pitch line thereof in order to have a wider face for placing characters thereon. As shown, the wheels 90j have numerals 0 to 9 thereon. All of the wheels 90j have a hardened steel ratchet 90j3 secured therein. Said ratchet is shown as having a rib or key 90j4 at one side which fits in a groove in the wheel 90j. The ratchet 90j3 has a bore with ratchet teeth in the wall thereof and a ball 90j5 is adapted to enter the spaces between said ratchet teeth, said ball being urged outwardly by a coiled compression spring 90j6 engaging the same and seated in a transverse bore in shaft 90i.

As stated, the wheels 90j are caused to move or rotate by the rack bars 128 to 132 respectively and this can occur when the teeth of the wheels in a totalizer unit 90 engage the teeth on one set of said rack bars. There are as many sets of rack bars as there are longitudinal sections or vertical rows of units 90 in the front board or panel member having the panels 72 therein. There are thus as many sets of rack bars as there are front sections 72 and rear sections 74 and sets of the retainer bars 96, 97 and 102 and retainer plate 94. When one of the units 90 is pushed in, as shown in the lower unit in Fig. 9, the wheels or numbering wheels 90j on that unit will have their teeth brought into engagement with the operating racks in that section.

The rack bars 128 to 132 inc. are guided as stated along the alinement plate 91 by the push rods 180 and they are also guided by an upper rack guide housing 184 which is alined with said racks by having a bored hub through which passes the dowel bolt 117. Said housing 184 is held against the alinement plate 94 by the nut 185 on dowel 114, which nut overlies a washer 186 engaging housing 184. Each housing 184 is also held against plate 94 by the headed and nutted bolts 188. (See Figs. 2, 9, 14 and 16.) The housing 184 and the front plate thereof allows free movement of the rack bars 128 to 132 and holds the rear surface of said bars firmly against the alinement plate 94. The rack bars 128 to 132 extend downwardly, as shown in Figs. 2, 3, 5, 7, and 15, into the lower sub-frame chamber of the main frame with the lower extension of said racks being properly held in position and spaced by the lower guide housing 77. Each housing 77 is held against alinement plate 94 by means of combination guide and roller bolts 191, 192 and 193. (See Fig. 15.) Said bolts have nuts engaging the outer side of housing 77. Housing 77 has pressed out ribs 77a engaging said racks, which ribs are substantially semi-cylindrical in vertical cross section and extend transversely of housing 77. The racks 128 to 132 which engage and drive the wheels 90j are in turn engaged and in mesh with individual drive gears 195, 195a, 195b, 195c and 195d, which, as shown in Fig. 5, are spaced vertically and are carried on their respective shafts 196, 196a, 196b, 196c and 196d. As shown in Fig. 7, the gears 195, 195a etc., are spaced longitudinally of shafts 196, 196a etc., in alinement with their respective rack of groups 128 to 132. The frame portion for supporting the driving and idler gears for the racks 128 to 132 consists mainly of the transverse angle member 59 which is bolted to channel member 60 (see Fig. 15) and the T bar 57 supported by brackets 202 in turn secured to the side channel members 54. The angle member 59 has bolted thereto angle plates 203 which are in turn supported by brackets 204 secured to vertical channel members 54. Disposed near the ends of the transversely extending frame member 59 are end bearing members 205 and 206 (see Figs. 2 and 6) which support the transverse rear shafts 198, 198a, 198b, 198c and 198d. Abutting the front face of said bearing members 205 and 206 are individual block bearings 207 (see Fig. 2), which support the transverse front shafts 196, 196a, 196b, 196c and 196d. The shafts journaled in rear bearings 205 and 206 are used to support idler drive gears 208 and 209 adjacent said bearings. The gears 197, 197a, 197b, 197c, and 197d on shafts 198, 198a, 198b, 198c and 198d are individually driven by their specific driving racks 210, 211, 212, 213 and 214 which have gear teeth thereon engaging their respective gear. As clearly shown rack 210 has teeth 210a for engaging the teeth in gears 197 etc. The rear longitudinal faces of racks 210 to 214 are cut with ratchet teeth 210b as shown in Fig. 5, which are spaced vertically along said racks and at the same pitch as the circular pitch of the rack teeth 210a. The end idler gears 208 and 209 drive gears at the ends of rear shafts 198, 198a etc., mesh with end gears 208a and 209a on front shafts 196, 196a etc.. these shafts carry gears 195 for driving racks 128 to 132. As stated, in a display board or panel having forty front sections there will be forty sets of racks for the number wheels 90j, each set having five racks. On shafts 196 there will be forty gears on each of the same and the same gear on said shaft will operate the same rack in each section. The respective gears 195 on shaft 196 will drive the respective racks numbered 128, gears 195a on shaft 196a, will drive racks 130, gear 195b drives racks 132, gear 195c drives racks 129, and gear 195d drives rack 131. The staggered arrangement of the gears prevents inter-meshing of the gears. The driving or actuating racks 210 to 214 inc., are moved by five sets of electric solenoids, four of which sets comprises three solenoids and one of which sets comprises two solenoids. The digit rack 210 is the only rack that is only operated by two solenoids. The solenoid 215 in successive energizations produces the upward movement of rack 210 and solenoid 216 operates the mechanism which prevents rack 210 from moving downward between actuations or pulsations of solenoid 215. The solenoids 215, 217, 218, 219 and 220 are all pulsated or actuated successively and they through certain mechanism move upwardly the racks 210, 213, 211, 214 and 212 respectively. There are hold-in solenoids or solenoids which prevent the downward movement of said last mentioned racks between pulsations which are solenoids 216, 222, 223, 224 and 225 respectively. (See Figs. 6, 36 and 37.) The solenoids 217, 218, 219 and 220 also have in alinement therewith solenoids 228, 229, 230, and 231 respectively. These latter solenoids 228 to 231 are used only when a debit, minus or subtraction tabulation operation is performed. It will be understood that the solenoids 215 and 216 are in vertical alinement and are in alinement with rack 210, while in the other four sets of solenoids the three solenoids 218, 223, and 229 and the three in the other three sets are in vertical alinement and said sets of vertically alined solenoids are in vertical alinement with the racks 211, 212, 213 and 214. The solenoids 229, 231, 228 and 230 and the solenoids 216, 223, 225, 222 and 224 are supported by a frame consisting of the transverse angle member 58 which is attached at its ends to channel members 54 and is connected by means of spaced angles 233 and 234 to another transverse angle member 235 which is supported by spaced angle members 236 bolted in turn to angle member 52.

The actuating solenoids 215, 218, 220, 217 and 219 are vertically spaced from the hold-in solenoids 216, 223, 225, 222 and 224 respectively by brackets 240 which are supported from the solenoid frame. The hold-in solenoids, such as solenoid 222 shown in Figs. 2, 3 and 4, has a headed core 222a which is connected by a link 241 to an intermediate point on a lever 242 which is pivotally connected to bracket 240 by a pivot pin 243. Lever 242 has a pawl 245 pivotally secured thereto at its front end, which pawl is engaged by a spring 246 which tends to swing said pawl into engagement with the teeth on rack 214 and to the position shown in Fig. 3. Lever 242 has a somewhat extended rear end which is connected by a tensile coiled spring 246 to an adjustable eye bolt 247 carried in an angle of the solenoid frame, the same being provided with a lock nut 248. Spring 246 urges the rear end of lever 242 upwardly. Bracket 240 has a cam surface 240a which is adapted to be engaged by a rear surface 245a on a portion of pawl 245 which extends below its pivot 249. A threaded stud 250 is disposed in bracket 240 adjacent the lower portion of cam surface 240a. The lever 242 has an upward projection or lobe 242a adjacent pawl 245 adapted to be engaged by the lower end of a rod 251, which rod is adjustable in length, being made of two threaded parts held in adjusted position by a nut 252. Rod 251 extends through a guide bearing 253a forming part of a bracket 253 secured by bolts 254 to the solenoid frame.

The upper end of rod 251 is adapted to engage a downwardly extending projection or lobe 256a on a lever 256 pivoted on a pivot pin 257 carried in an arm of bracket 253. Lever 256 is connected in the rear of its pivot 257 by a link 258 to the headed core 217a of actuating solenoid 217. Lever 256 has pivotally connected to its front end by the pin 259 a pawl 260 engaged by a spring 261 which tends to spring the upper end thereof forwardly into engagement with rack 214 or to the position shown in Fig. 3. The rear end of lever 256 is connected by a tensile coiled spring 262 to an adjustable eye bolt 263 secured in a bracket 264 which is carried by angle member 59. Eye bolt 263 is provided with a lock nut 265. It will be seen that spring 262 tends to swing the rear end of lever 256 upwardly to move pawl 260 downwardly and away from rack 213. It will be noted that when solenoid 222 is energized pawl 245 will be raised and brought into engagement with the ratchet teeth on rack 213 and that rod 251 will raise the front end of lever 256 and bring pawl 260 into engagement with the ratchet teeth on rack 213, as shown in Fig. 3. When the hold-in solenoid 222 is energized it will be seen that pawls 245 and 260 will be brought into engagement with the ratchet teeth on rack 213, as shown in Fig. 3, and that when actuating solenoid 217 is actuated, pawl 260 will be moved upwardly by lever 256 a distance of one ratchet tooth for each actuation of solenoid 219. Said rack will be prevented from dropping between actuations of solenoid 217 by pawl 245. When the solenoids are de-energized, pawl 245 will have its surface 245a engaged by the cam surface 240a and its upper end will be swung out of engagement with rack 213. When both solenoids are de-energized, rack 213 will drop and racks 128 to 132 will move downwardly.

The lower ends of racks 210, 211, 212, 213 and 214 are provided with an adjustable cap 268 which is threaded on the end of each rack and held in position by a lock nut 269. The lower position of rack 210 is determined by the position of an adjustable screw 270 threaded into a yoke bracket 271 riveted to the base plate 50. The lower position of racks 211, 212, 213 and 214 is determined by the position of a roller 274 journaled in the front end of a lever 275 which is oscillatably mounted on a pivot pin 276 carried in a bracket 277 secured by bolts 278 to base plate 50. There is one of the levers 275 for each of said racks. The lower position of roller 274 is determined by the position of a screw 279 threaded into the lower angle of the solenoid frame and provided with a lock nut 280. A cam block 230b is secured to the lower end of solenoid core 230a of solenoid 230 and has a front cam surface 230c adapted to be engaged by a roller 281 on the rear end of lever 275. There is one of the cam blocks similar to block 230b on the lower end of the cores of solenoids 229, 231 and 228 respectively. The block 228g at the bottom of core 228a of solenoid 228 has a cam surface 228c at one side which acts upon a spring contact strip 228d to move the contact thereon into engagement with the contact on spring contact strip 228c. This structure is used in a minus tabulation as will be later described. The racks 210, 211, 212, 213 and 214 are guided by the shaft extension 283 secured to each of the same and which is movable through the guide bushing 284 secured to the top of transversely extending member 60. There is one of said bushings for each of said racks. The front, back and side surfaces of said last mentioned racks engage the flange ball bearings 286 supported in brackets 287 which extend down from and are secured to frame member 57. (See Figs. 2, 3 and 4.)

There is used in connection with the display board or panel portion shown in Figs. 1 to 24, a keyboard device shown in Figs. 25, 27 and 28, and also shown diagrammatically in the wiring diagrams 33 to 35. Referring to Figs. 25 to 28, this keyboard device 300 comprises a casing section 300a to which is secured the cover portion 300b. Said device also includes a cabinet portion 300c for containing certain parts thereof. The top of portion 300b is provided with rows of openings for the stems or shanks 301a of keys 301, which shanks or stems 301a are movable through guide bushings 302 and through vertically insulating plates 303 and 304. As shown in Fig. 25, there are five rows of keys 301 on the righthand side of the keyboard device 300 and there are similarly five rows of similar keys 306 on the left-hand side of said member 300. The structure of the keys 301 and 306 is the same and the keys in each of said rows will bear certain characters which will be the same as the characters on the wheels 90j so that in the embodiment of the invention illustrated keys 301 and 306 will have designations on their tops of numerals 0 to 9 just as the wheels 90j have the numerals 0 to 9 thereon. Each of the keys 301 and 306 have a block 307 of insulating material on the shank thereof shown as between plates 303 and 304, which block has a cam projection 307a adapted to engage the contact strip 308 carried on a binding post 309 secured in plate 303. Contact strip 308 has a contact 308a thereon adapted to be engaged with a contact 310 carried on a binding post 311 secured in plate 304. It will be seen, as shown in the right-hand side of Fig. 27, that when one of the keys 301 or 306 is depressed that the contacts 308a and 310 will be engaged. In Fig. 29, the wiring diagram for the device of the invention is shown and it will be seen that at the top of said diagram the keys 306 and 301 are shown. Associated with each of the keys 301 and 306 is a relay 316 of the general type shown in Fig. 28. In Fig. 29 these relays for keys 301 are shown at the upper part of said figure and at the right. The keyboard device 300 also has a central bank of keys 320. The keys 320, as shown in Figs. 25 and 27, are disposed below the top of cover section 300b and have shanks 320a adapted to close certain contacts to be later described.

Keys 320 are not actuated manually by the operator but are depressed by solenoids 321 disposed over said keys and having conductors 322 and 323 leading therefrom. These solenoids are shown in the wiring diagram in Fig. 29 to the right of the keys 306. The keyboard device 300 includes a tape 325 on which will be printed certain code numbers 326 shown in the central column in Fig. 26. Each of the units 90 on the display board carries a code number on the panel portion 72c. When a tabulation is made and displayed on the number or character wheels of any one unit 90, the code number carried on that unit will be printed on the tape 325, as shown by the numerals designated 326 which are in the center column on said tape. The keys 320 are operated for said operation of printing the code number on tape 325 and this is done by actuation of code solenoids 321. The bank of keys 301 on the keyboard device constitutes the plus, credit or adding section, and the keys 306 constitute the subtraction, debit or minus section. Said keyboard device is provided with a key 314 which when it is depressed will actuate mechanism to print the total after either a single or multiple plus or adding transaction, as shown in the right-hand column 326a on tape 325. Said keyboard device also has a key 315 at its left-hand section which when depressed will actuate mechanism to print the total after either a single or multiple minus or subtracting transaction, as shown in the left-hand column 326b on tape 325, as shown in Fig. 26. Said device 300 is provided with a main switch 328 for placing the device in condition for a plus or minus operation, as indicated by the plus and minus signs in Fig. 25. Switch 328 can be turned to engage a plus pole 328a or a minus pole 328b. These are shown at the bottom of the wiring diagram in Fig. 29. When switch 328 is turned to engage the plus pole 328a a number of swinging armatures or contact arms 340, 341, 342 and 343 are also mechanically turned to engage contacts 340a, 341a, 342a and 343a. Should switch 328 be turned to engage its minus pole 328b, said arms or armatures would be also turned to engage contacts 340b, 341b, 342b, and 343b. (See Figs. 36 and 37.)

The said arms 340 and 343 and their contacts are disposed in the device 300. Said member 300 is also provided with a single contact switch 329 which will turn on or off the electrical current for operating the device of the invention. When switch 329 is moved to place the device in operative condition the circuit is closed through a lamp 330 which will indicate that the device is in operative position and supplied with current. When switch 328 is turned to engage the minus pole 328b the red lamp 330 is on, and a green lamp 332 in the front of section 300b will be illuminated only during a minus operation after a tabulation has been made and the racks are in a raised position. This temporary light informs the operator that all parts of the machine are now in position to receive a totalizer unit 90, which is then pushed in and locked after which the operator operates switch 485 cutting out the green lamp circuit for 332, but closing new circuits to complete this cycle. The cable to which electric current enters the device is indicated as 331 in Fig. 25. When one of the keys 301 or 306 is depressed it will remain in that position until the end of the tabulating cycle or until a solenoid 334 is energized to close a circuit through a pair of contacts 334a and conductors which lead to an electric motor 335 which functions to move all parts of the keyboard device 300 back to starting or neutral position. The solenoid 334 as well as the relays 316 for the circuits of keys 301 and 306 will be mounted in the sections 300c of device 300, as shown in Figs. 38 and 39. The relay 316 shown in Fig. 28 can be adjusted to be either a break, make, relay, or a make, break, relay. It comprises outer contact strips 316a and 316b and a central contact strip 316c. When the relay is energized the contact on strip 316c may engage the contact on strip 316b before breaking the engagement with the contact on strip 316a. In other cases it may break the engagement with contact strip 316a before it makes engagement with the contact on strip 316b.

When adding or subtracting a single number or a number having more than one digit on the numbering wheels, all of the parts must be first put in neutral non-operating position, as shown in Fig. 11. If a number 6 is to be added to a totalizer unit 90 all numbers on the wheels previously being at 0 the only rack that would move upward by action of the actuating solenoid would be rack 128. The totalizer unit 90 would be pushed in from the position shown in Fig. 11 to the inward position shown for the lower unit in Figs. 9, 12 and 21. When the unit is thus pushed in it will be locked in its inward position by the descent by gravity of its keys 111. The rack 128 will be moved up to the position shown in Figs. 9 and 12 with the totalizer unit still in its inward position, as shown by the lower unit in Fig. 9. The upward movement of rack 128 causes the teeth of the numbering wheel 90j, shown at the right in Fig. 22 and which is the digit wheel, to rotate in a clockwise direction the distance of six teeth, thus advancing the reading on said wheel from 0 to 6. Assuming this to be the end of the tabulation, totalizer unit 90 will now be released by actuation of the solenoid 174 which lifts bar 107 and all of the bars 104 carrying the keys 111. The unit will be pushed out at its outward position by action of spring 90v.

It will be apparent that when a minus operation is to be tabulated that the numbering wheels must be turned in a counterclockwise direction. This is done by first raising the rack or racks desired the total number of teeth that corresponds to the number to be tabulated with the totalizer unit 90 still in its outer or non-operating position. After the racks are raised the height necessary to register the number desired the proper totalizer unit 90 is pushed in to engage its teeth with the teeth of rack 128 and the other racks of the set. The racks now being in raised position are then released so that they automatically drop to their lower position by gravity and they thus turn the numbering wheels the desired number of teeth. The number desired is thus subtracted from the number previously registered on the wheels.

The device also comprises a specially constructed motor driven rotary operating device shown diagrammatically in Fig. 29 and designated generally as 345. This device comprises a central shaft 346 to which is secured an arm 347 which when the driving motor shown as 344 in Fig. 29 is actuated will move in a clockwise direction, as shown by the arrow in Fig. 29. In a tabulating operation the arm 347 makes one revolution. Arm 347 has a projecting lug 347a thereon and said arm also has thereon a semi-circular segment 347b which is shown in Fig. 29 as of a smaller radius than the radial distance of lug 347a. The arm 347 with its parts 347a and 347b is made of electrically non-conducting material. In the rotation of device 345, lug 347a is adapted to successively engage one of the contacts in a plurality of pairs of contacts 348 and 349. Said contacts 348 and 349 are carried on spring arms mounted on insulating blocks 350. There are five groups of similar contacts which correspond to the number of numbering wheels illustrated and to the number of rows of the keys 301 and 306. It will be understood that a smaller or larger number of wheels, corresponding keys and said contacts could be used. The second group of contacts engaged by lug 347a comprise contacts 351 and 352. In the third group there are nine pairs of the contacts 353 and 354. In the fourth group there are nine pairs of the contacts 355 and 356. In the fifth group there are nine pairs of the contacts 357 and 358. The nine pairs in each of the five groups correspond to the nine numbers from 1 to 9. Radially inward of the groups of contacts described are five groups of other contacts. In the first group there are nine pairs of contacts 361 and 362. In the second group there are nine pairs of contacts 363 and 364. In the third group there are nine pairs of contacts 365 and 366. In the fourth group there are nine pairs of contacts 367 and 368. In the fifth group there are nine pairs of contacts 369 and 370.

The contacts of the pairs in the outer five groups are normally in open or disengaged position while the contacts of the pairs in the inner group are normally in closed or engaged position, as shown in Fig. 29. Device 345 also has arms 372, 373, 374 and 375 which carry contacts 372a, 373a, 374a and 375a. The arms 372 to 375 are swingable about their outer ends and at their inner ends have slightly bent portions which engage segment 347b. As arm 347 rotates, segment 347b successively passes the arms 372 to 375 allowing the arms to swing to engage the contacts thereon with contacts 372b, 373b, 374b and 375b respectively. The lug 347a on arm 347 is also adapted to engage one contact arm of each pair of a plurality of pairs of contacts 378, 379, 380, 381, 382, 383 and 384, as shown in Fig. 29.

In operation when a tabulation is to be made, the device operates as follows: Let us assume that a plus tabulation is to be made to show the amount 97385 on the unit bearing code number 964. Assume that the numbers on the numbering wheels of said unit are all at 0 so that the unit indicates 0–0–0–0–0. The operator will first turn switch 328 clockwise, as shown in Fig. 25, so that the same engages the plus pole 328a, as shown in Fig. 29. Current is now supplied to the device and the signal lamp 330 which will preferably be a red light indicates that the current is on. When switch 328 was turned, the arms 340, 341, 342 and 343 were also mechanically turned to engage the contacts 340a, 341a, 342a and 343a, as shown in Fig. 36. A plus line circuit now extends from the main line 390 through switch 328 and contact 328a to the open contacts 378 and 379, as shown in Fig. 29. Current also passes through the switch arms 340 to 343, inc. to the contacts 340a to 343a, inc. respectively to lines 391, 392, 393 and 394 respectively, as shown in Fig. 36, through solenoids 217, 218, 219 and 220 to line 400, which is the return line or ground line.

Said circuit includes the contacts 100b on bus bar 100 which is arranged to be engaged by the contact 148c on contact strip 148a which is adapted to be moved by the push rod 181 when cam 90j2 of wheel 90j does engage with projection 90e1 during the rotating cycle of said wheel when the totalizer unit 90 is pushed inwardly. Said circuit through said solenoids 217, 218, 219 and 220 is held open as long as said unit 90 is not pushed inwardly or while 90j2 does not engage 90e1 or in other words as long as the contacts on the contact spring fingers 148a, 148b and 149a and 149b are not moved by the push rods 181 or 181a. The said circuit is used for advancing the distance of one tooth on the wheel 90j in advance of the one being operated or turned whenever the turning wheel has completed one revolution or when it has advanced one complete cycle or past the number 0. Thus a wheel having number 6 thereon which is advanced seven teeth will be rotated until number 3 appears on its display position or face reading, but when its 0 number appeared in the display position or on its face reading the number 1 appeared in the display position or face reading of the next numbering wheel to the left, as shown in Fig. 23. Thus during the tabulation 7 the wheel 90j at the right, which is the digit wheel, completes a cycle from 9 to 0. A closed circuit between the contacts 100b and 148c will be made to energize solenoid 217 which will advance the next wheel to the left, which is the tens column forward one tooth. This closing of the contacts 148c and 100b is accomplished by the projection or lobe 90j2 on the disks 90j1, which as above described, rotate with the number wheels 90j. The operator will check over the keys 301 and having determined that there is no unfinished tabulation on the keyboard device will then tabulate the number 97385. This tabulation consists of pushing or striking the (9) key in the ten thousand column, the (7) key in the thousands column, the (3) key in the hundredths column, the (8) key in the tens column and the (5) key in the digit column.

These keys are thus now in the position shown by the right-hand key in Fig. 27. The main line current from line 390 is permanently connected to the common post 311 of all of the keys 301 and 306. (See Figs. 29, 33, 34 and 35.) From each key contact 308a an individual electrical connection is made to corresponding normally opened spring contacts 5DA, 8EA, etc. of the corresponding R–10 relay group, as shown in Figs. 29, 33, 34 and 35. For example, digit key 301 with the number 5 thereon has an electrical conection only to the spring contact 5DA of relay 5D. The key 301 in the second or tens column with the number 8 thereon has an electrical connection to spring contact 8EA of relay 8E, etc., as shown in Fig. 29. With the number of wheels 90j shown in the embodiment of the invention illustrated, the units can display sums up to 99999. With the use of more wheels of course more rows of the keys 301 and 306 larger sums could be displayed. The columns reading from right to left on either group of the keys 301 and 306 denote in the numbers displayed the digit position, the tens position, the hundredths position, the thousands position, and the ten thousandths position. As stated, the number 97385 will be used as an example tabulation. When digit key 5 is depressed, current will be supplied to contact 5DA of relay 5D; when key 8 is depressed, current will be supplied to contact 8EA of relay 8E; when the hundredths key 3 is depressed, current will be supplied to contact 3FA of relay 3F; when thousandths key 7 is depressed, current will be supplied to contact 7GA of relay 7G; and when ten thousandths key 9 is depressed, current will be supplied to contact 9HA of relay 9H, as shown in Fig. 29. The letter "D" is used to represent the digit columns of relays, the letter "E" the tens column, the letter "F" the hundredths column, the letter "G" the thousandths column, and the letter "H" the ten thousandths column in which the R–10 relays are located. The contact fingers 5–DA, 8EA, 3FA, 7–GA and 9–HA are all shown in open circuit and will remain open until a totalizer unit 90 is pushed in or pushed rearwardly to its inner position where it will be locked by one of the keys 111.

Said totalizer unit is now pushed in, closing the code contact from line 390 through the contacts 136a on bus bar 136 and contacts 168 and 169a on strips 167 and 169 to lines 403, 404 and 405 to and through solenoids 321–9, 321–6 and 321–4, as shown in Fig. 29. The said solenoids are the solenoids operating the keys 320 having the numbers specified in the three rows thereof respectively, as shown in Fig. 25. From the solenoids 321–9, 321–6 and 321–4 the current flows to line 407 through the spring contacts 408a and 408b of a relay 408 into line 410, through all of the closed contacts R–411 of the R–10 relays, thus energizing all of the R–10 relay coils, to and through the coil of a relay 412 and then through the line 414 to return line 400. This completes a circuit from line 390 and bus bar 136, through the contacts above set forth and through three of the code solenoids 321. The circuit also includes the contacts 408a and 408b of relay 408 and the coils of all of the R–10 relays as well as the coil of relay 412. This is a very important circuit but is only temporarily used. It provides the temporary means for energizing the R–10 relays which when energized break or separate all of the R–411 contacts but close the circuit from the depressed keys at contacts 308a and 310 which have been closed since the keys were depressed for tabulating number 97385 When the solenoids 321–9, 321–6 and 321–4 are energized their corresponding keys 320–9, 320–6 and 320–4, as shown in Fig. 25, are depressed and a code number 964 printed on tape 325 after the motor 335 is cut into the circuit. This is the code number of the unit on which the tabulation 97385 will be displayed. The circuit through relay 412 closed contacts 412a and 412b from the main line 390 to line 415 and to the coil of relay 408. The circuit then continues through line 416, contacts 418a of a solenoid 418, then through line 419, through contacts 420a of a relay 420, then through motor 344 and through line 421 to return line 400. This circuit also continues from contacts 418a through line 419, through line 419a and contacts 422a of a relay 422 through the hold-in solenoids 216, 222, 223, 224 and 225 to return line 400. This latter circuit through conductor 419a and the hold-in solenoids is parallel with the circuit from line 419 which goes through contacts 420a previously traced. The last circuit traced which goes through the hold-in solenoids, actuates said solenoids so that they are actuated at the same time motor 344 is started. As above stated, motor 344 is the operating or driving motor for the rotary device 345 and when said motor is started, arm 347 of said device begins its movement in a clockwise direction.

When the coil of relay 408 is energized, contacts 408a and 408b are separated and this opens the circuit from line 407 and from line 410 to all of the R–10 relays. This circuit is the temporary circuit described above and which is the first circuit traced. Now only those R–10 relays are energized that receive current from line 390 through the closed contacts 308a and 310 of the depressed keys 301 having the numbers 9–7–3–8–5, thereon in their respective rows. This circuit goes through the contact springs DA, EA, FA, GA and HA, as shown in Figs. 33, 34 and 35, which are now closed with the contact springs DB, EB, FB, GB and HB. (See Figs. 33, 34 and 35.) In said figures of course only the DA and DB contacts are shown. Relay 412 is also de-energized so that contacts 412a and 412b are now separated so that the circuit through coil of relay 408 will extend from the line 390 through the contacts 408c of relay 408, through the coil of relay 408, line 416, contacts 418a of solenoid 418, line 419, through contacts 420a of relay 420 and thence to the motor 344. The line 419a continues through the hold-in solenoids 216, 222, 223, 224 and 225, as already explained. The contacts 408c are engaged before the contacts 408a and 408b are separated.

The arm 347 is now rotating. The code solenoids 321–9, 321–6 and 321–4 are de-energized but the keys 320 which were depressed when said code solenoids were energized remain depressed and have closed a circuit which will print the code number on tape 325 when the motor 335 is put in circuit and started. The keys 301 have been depressed and remain in depressed position so that the number 97385 will be printed on tape 325 when motor 335 is put in circuit and started. In tracing the circuits for the numbers 9–7–3–8–5 they will be completed in the order 5–8–3–7–9, since the same method used in the addition and/or subtraction of numbers applies in the addition to or the subtraction from an existing total or number already displayed in the totalizer unit 90. As above explained, the operation of the digit number wheel 90j may affect the value or position of the tens column wheel, the tens column wheel 90j may affect the value or display of the hundredths column wheel, the hundredths column wheel 90j may affect the value or number displayed on the thousandths wheel, and the thousandths wheel 90j may affect the value or number displayed on the ten thousandths wheel. The digit is therefore always operated first. As above explained, if the tabulation on that wheel carries the resulting quantity beyond (9) the next numbering wheel to the left is turned forward one number. This is done as explained by the disks 90j2 on the disks 90j1 engaging the projection 90e1 on the fingers 90e to cause the same to move push rods 180, 181 and 181a inwardly. The same action occurs when a subtraction is made from a registered amount in which operation the numbering wheel 90j is turned backwards or counter-clockwise. In addition when any numbering wheel passes the number 9 on the face thereof, the next numbering wheel is carried forward one number or the space of one tooth, but in subtraction when a numbering wheel 90j passes the number 0 on the face thereof, the next numbering wheel is moved backward or counter-clockwise the space of one tooth.

When the relay coil R–10–5D is energized, it engages contacts 5–DA and 5–DB and separates contacts 5–DB from contact at R–411, as shown in Fig. 35. The current now flows from line 390 through contacts 308a and 311, through 5–DA and 5–DB, through the coil of said relay R–10–5D, through line 430 to closed contacts 361 and 362 in the fifth pair from the bottom, as seen in Fig. 29. These are the contacts in the first group of contacts traversed by lug 347a in the rotation of arm 347. They are designated 361–5. The circuit then passes through line 431, through a solenoid 432 and to the return line 400. This circuit energizes solenoid 432 and closes or engages contacts at 432a thereof. Current now flows from line 390 through line 433, contacts 432a, through line 434 which extends to the open contacts 349. The current from line 434 will go through successive pairs of the contacts 348 and 349 as they are closed by lug 347a in the rotation of arm 347. The current will only flow through the contacts 432a as long as relay 432 is energized. The current from line 430 through its closed pair of contacts 361–5 controls the length of time that relay 432 is energized or held in a circuit and hence also the number of circuits that will be made and broken as lug 347a successively engages the contacts 348. The circuits closed through the successive pairs of the contacts 348 and 349 pass from line 436, through solenoid 215 and through line 437 to return line 400. Solenoid 215 is thus given five actuations or five pulsations so that all of the digit racks 128 will be raised to a height equal to five tooth spacings of said racks or wheels 90j. This turns the engaged digit wheel around five tooth spacings so that number 5 is in display position. When lug 347a opens the contacts 361–5, the current from line 390, through the coil of relay R–10–5D and line 430 will be broken. This will open the circuit to solenoid 432 permitting contacts 432a to open and no further actuations or pulsations of solenoid 215 occurs.

The breaking of the circuit just described also causes de-energization of solenoids R–10–5D. The arm 347 continues its rotation and makes and breaks the remainder of the contact pairs 348 and 349, but this has no effect. The electrical connection to the contacts 361–5 is through the coil of relay R–10–5D since the number 5 is being tabulated. Each digit coil of the R–10 relays which are numbers (1–D), (2–4) and (3–D), etc. in the digit column on the R–10 relays has an electrical connection from its relay coil to a corresponding contact 361 in the digit sector of the rotary device 345. The number (9–D) will connect to contact 361–9 and likewise with all lines leading out through conductor 431. The total number of make and break circuits completed in any one of the sector groups of contacts in device 345 is the same as the number tabulated for that sector and the same has the number on the key 301 in member 300 which is depressed. Each make and break circuit referred to will close a circuit through the proper actuating solenoids 215, 217, 218, 219 and 220, and the proper racks will be raised to turn the numbering wheel to display the number desired, which is the same as the number of actuations of said solenoids. The arm continues its movement and lug 347a will next engage the pairs of contacts 363 and 364 and the pairs of contacts 351 and 352. The action will be the same as already described for the digit sector. When the pair of contacts 363 and 364, which are number 7 from the left-hand side of the group, are opened, the circuit through relay 432 will be opened and there will thus be seven make and break operations of the pairs of contacts 351 and 352. If the number to be tabulated in any one column is 0, there will be no connection made to the relay switch contacts for that column, thus there will be no actuation of any solenoid or any pulsations of a solenoid for that column, since the R–10 relay for that column will be an open circuit and the main current supply line 390 will be opened.

When digit number 5 is tabulated, solenoid 215 is actuated or pulsated five times and it moves upward during each pulsation or movement the rack 210 which rotates gears 197 which turn shaft 198 and its end gears 208 and 209, which end gears turn gears 208a and 209a of shaft 196, and shaft 196 rotates the forty rack gears 195 which in turn move upwardly all of the racks 128 the distance of five tooth spacings of the racks 128. The numbering wheels of the locked-in totalizer unit having the code number 964 therein are engaged with a set of the gear racks 128, 129, 130, 131 and 132. Rack 128 having been operated will turn the numbering wheel 90j in the locked-in unit 90 a distance of five tooth spacings so that said numbering wheel now has in display or reading position the numeral 5. During this tabulation or operating cycle the pawl 245 is allowing the rack to move upwardly while at the same time it is preventing it from moving downward from its actuated position while pawl 260 is being given another actuation.

Means are provided so that during the tabulating cycle of the digit column or of the other columns no other column will be in operative position. Referring to Fig. 29, as has been described, there is a member 372 swingable about its outer end and engaging at its other end the segment 347b. While arm 347 and its lug 347a are moving past the contacts in the first or digit group, the contact 372a on member 372 is out of engagement with the contact 372b on the contact spring adjacent thereto. The line or conductor 440 therefore is open. After lug 347a has passed all of the pairs of contacts in the first or digit group, segment 347b passes out of engagement with members 372 permitting it to swing and engage contacts 372a and 372b. The engagement of said contacts closes the circuit to pulsating solenoid 217 which will operate the tens column rack 129. The circuit for operating solenoid 217 extends from the main line 390 through the contacts 308a and 311 closed by the key 301 which is numbered 8 in the tens column through the contacts 8–EA and 8–EB in the number 8 relay in the second column of the R–10 relays, through the coil 8–E of said relay, through conductor 441, the closed or engaged contacts at 363–8 in the second or tens group of the inner set of pairs of contacts, out through line 442, through coil 444, through line 443, through coil 217a and from said coil to return line 400. Said circuit had been closed with the exception of being open at the contacts 372a and 372b, which contacts could not move into engagement until the end of segment 347b passed the lower end of swinging arm 372. With the circuit just traced, established current from line 390 passes through the closed contacts 444a of relay 444, through line 446, the contacts 351a when these are closed by lug 347a in the movement of arm 347, then through line 447 to which one of said contacts 351a is connected, then through the contacts 372a and 372b which are now engaged, through line 440, through closed contacts 217a1, through line 448 to and through solenoid coil 217 and to return line 400. It will be seen that contacts 351a constitute the eighth pair of contacts in the second or tens group of contacts of device 345. As lug 347a therefore rotates, it will successively close eight of the pairs of contacts 351 and 352 so that solenoid 217 will be given eight actuations or pulsations before the circuit from line 390 is opened. The circuit will be opened as explained in connection with the digit group when lug 347a engages the eighth contact 363-8 of the inner group of contacts in the second or tens group. The successive actuations of solenoid 217 moves upward rack 213 a distance of eight tooth spaces which turns gear 197c, thus turning shaft 198c and its end gears 208 and 209. Gears 208 rotate the set of engaged end gears 209 and 209a of shaft 196c, and shaft 196c and its gears 195c move forty racks 129 upwardly a distance of eight tooth spacing of said racks. These racks 129 will turn the numbering wheels 90j of the locked-in units 90 a distance of eight tooth spacing. The numbers 8–5 on the digit and tens wheels 90j have now been tabulated and these numbers are now in display position on said wheels.

It will be seen that the three succeeding numbers to be tabulated, namely 3, 7 and 9, will be tabulated in the same way by depressing the keys 301 numbered 3, 7 and 9 in the hundredths, thousandths and ten thousandths columns on the keyboard device 300. Relays will be closed in the respective columns in the bank of relays R–10 and the solenoids 218, 219 and 220 will be given the desired number of actuations respectively as lug 347a engages the contact springs in the third, fourth and fifth group in device 345. The cam 347b will successively pass out of engagement with the arms 373, 374 and 375 so that the actuating lines from each of the groups of contacts in device 345 will be successively opened.

The electrical circuits for tabulating said numbers 3, 7 and 9 on the third, fourth and fifth numbering wheels 90j of the locked-intotalizer unit 90 will be traced. The circuit for the depressed key 301 in the hundredths column will engage its pair of contacts 308a and 311, and the circuit will extend through contacts 3–FA and 3–FB of the third relay in the hundredths column of the R–10 bank of relays, then through coil 3–F of said relay, through line 449, through the third pair of contacts 365 and 366 which are designated 365–3, then through line 450 to and through the coil of relay 444A, line 451 to and through the coil of relay 218A and to return line 400. The contacts 218A1 of relay 218A are closed and the contacts 373a and 373b are now closed since segment 347b has passed arm 373 so current can now pass from line 390 through contacts 444A1 into line 452, through the third pair of the contacts 353 and 354 which are designated 353a, through line 453 to and through the now engaged contacts 218A1 of relay 218A, through line 454 to and through the solenoid 218 and through line 437 to return line 400. These described circuits turn the third or hundredths numbering wheel 90j from its existing position forward three additional tooth spacings, solenoid 218 is actuated or pulsated three times and rack 211 is moved which rotates gear 197a which rotates shaft 198a, its end gears 208, 209 and 208a, 209a, the latter turning shaft 196a. This shaft turns forty of the rack gears 195a. This elevates all of the racks 130 the distance of three tooth spacing. This turns the third or hundredth wheel 90j in the locked-in totalizer unit 90 three spaces so that the numeral 3 is now displayed.

The depression of key 301 in the thousandths column having the number 7 thereon closes its contacts 308a and 311. The circuit passes from said contacts through contacts 7–GA and 7–GB of relay 7–G which is the seventh relay of the thousandths column of the R–10 bank of relays. The circuit passes through the coil of relay 7–G, through line 455, through the seventh pair of contacts 367 and 368 which are designated 367–7, then through the common line 456, through coil of relay 444B, line 457 to and through the coil of relay 219A and to return line 400. This circuit closes the contacts 219A1 since the segment 347b has passed the arm 374. A circuit is thus closed from main line 390 through the contacts 444B1 of relay 444B, through line 458 and all the contacts 355 and 356 through 355a in the thousandths outer group of contacts on device 345. The circuit then passes through closed contacts 374a and 374b, through line 459, through contacts 219A1, through line 460 to and through solenoid 219 and to return line 400. Solenoid 219 is given seven actuations or pulsations as lug 347a successively closes and opens seven of the pairs of contacts 355 and 356. This moves upward rack 214 which turns gear 197d, thus turning its shaft 198d and through end gears 208, 209 and 208a and 209a, turns shaft 196d. This rotates forty of the rack gears 195d which are in engagement with racks 131. These racks are elevated a distance equal to seven tooth spacings of the rack and the fourth numbered wheel 90j which is on the locked-in totalizer unit 90 is forwarded seven tooth spacings so that the number 7 is now displayed on said wheel. When the key 301 in the ten thousandths column having the number 9 thereon is depressed, it closes its contacts 308a and 311 and current is passed through contacts 9–HA and 9–HB and through coil 9–H in the ten thousandths or left-hand column of the R–10 relays, as shown in Fig. 29.

Current now passes through contacts 308a and 310 of the 9–H relay and a circuit is closed through contacts 370 and 371 in the last group of closed contacts on device 345, through line 462, to and through coil 444C, line 463, through the coil of relay 220A and to return line 400. This circuit when closed closes the contacts 220A1 and with contacts 375a and 375b closed, the lug 347a will make and break a circuit by engaging and disengaging the contacts 357 and 358 in the outer open group of contacts in the left group of device 345, thus causing nine actuations or pulsations of solenoid 220. This circuit extends from main line 390 through the contacts 444C1, line 464, the make and break contacts 357, 358, through contacts 375a and 375b now closed, out through line 465, through the closed contacts 222A1, line 466 to line 467, through solenoid 220 and to return line 400. The nine actuations or pulsations of solenoid 220 causes the numbering wheel 90j in the ten thousandths column, which is the one at the left-hand end in Figs. 30 and 32, to move nine tooth spaces. The solenoid 220 moves the rack 212 which drives gear 197b on shaft 198b, said shaft having a set of end gears 208, 209 which mesh with gears 208a and 209a on shaft 196b which has secured thereto the rack gears 195b and these gears move all of the racks 132 upward. The totalizer unit 90 which is in mesh with its rack will have numbering wheel 90j advanced nine tooth spaces so that the numeral 9 is in display position.

The complete tabulation of the numbers 9–7–3–8–5 has now been completed on the numbering wheels 90j of the totalizer unit 90 which has been pushed in and which has been locked in its operative or functioning position by the keys 111. The tabulation having been completed, said totalizer unit which has been pushed into rack-engaging position will now be released to its outer or inoperative position. All of the circuits from the contact switches 301 and their contacts 308a and 310 have been opened since the tabulating cycle of the device 345 has been completed and lug 347a has passed over all of the groups and has engaged and disengaged the desired number of contacts in said groups. The arm 347 and its lugs 347a has now completed its cycle with the exception of making and breaking the contacts 378, 379, 383 and 384. These contacts are all connected to the plus line circuit. The other contacts 380, 381, 382, as well as the contacts 383 and 384 are in the minus line circuit and only function in said minus contact when switch 328 is moved to engage the pole or contact 328b.

The arm 347 now continues its movement and lug 347a moves into engagement with contacts 378 momentarily engaging the same and completing the circuit from line 390 through switch 328 and pole or contact 328a, line 468, through contacts 378, line 469, to the lock and release bar solenoids 174 and to return line 400. These solenoids 174 move their cores 174a upwardly and raise the bars 107. This lifts all of the bars 105 and bars 104 which carry the locking keys 111. The totalizer unit 90 which has been locked-in in its inner or rack-engaging position, is now released and said unit is pushed to its outer or inoperative position by spring 90v. The contacts 136a on bar 136 are thus put out of engagement with contacts 168 on the spring clips 167 which move away from contacts 136a. Contacts 168 also move away from contacts 170 as spring 167 is released. The totalizer unit which has just been released is thus now ready for another tabulating operation.

Referring to the wiring diagram in Fig. 29, it will be noted that the original code circuit traced was opened when relay 408 was energized which opened contacts 408a and 408b and closed contacts 408c. These latter contacts are still in engagement. With all of the totalizer units 90 now disengaged from their respective racks, the next operation will be to release said racks from their now elevated position to their neutral, inoperative or lower position, as shown in Fig. 5.

The arm 347 and its lug 347a is still moving and it now momentarily closes contacts 379. A circuit is closed from main line 390, through switch 328, contact 328a, line 468, contacts 379, line 470, through relay coil 422, then to return line 400. The relay 422 being energized engages one contact 422a with the contact 422b and separates the contacts 422a. This leaves the circuit through motor 344 still closed but opens the circuit to the hold-in solenoids 216, 222, 223, 224 and 225. These solenoids are thus deenergized and moved to the position shown in Fig. 5. The pawls 260 and 245 are thus out of engagement with their actuating racks.

When relay coil 422 was energized the circuit through motor 344 from line 419 through the contacts 420a was still closed so that the arm 347 with its lug 347a was still rotating. The circuit through the solenoids 216, 222, 223, 224 and 225 cannot again be closed during the present tabulating cycle or operation since the current from line 419a now passes through the closed contacts 422a, 422b and through the coil of relay 422 to return line 400. The contacts 422a are thus separated and this opens the circuit through the hold-in solenoids 216, 222, 223, 224 and 225, which circuit will remain open until relay 422 is de-energized.

Arm 347 moves until 347a engages and momentarily closes the contacts 383. This closes a circuit from main line 390, line 471, through contacts 383, line 472, through coil 334, then through line 414 to return line 400. This energizes relay 334 and engages the contacts 334a. Engagement of said contacts closed a circuit from main line 390 through contacts 334a, through motor 335 and to return line 400. Motor 335 operates the mechanism in the member 300. This motor is now started and operates the printing mechanism which prints the code number 964 and the number 97385 on tape 325. Operation of this motor also releases all of the keys 301, 306 and 320 that have been depressed in the tabulating operation. Tape 325 is also moved up to the next printing line or space. The closing of contacts 383 therefore placed motor 355 in operation and performed the operations above noted.

Arm 347 is still rotating and lug 347a engages contacts 384. A circuit is now closed from main line 390 through contacts 384, line 473 to solenoid 418 and to return line 400. Solenoid 418 is now energizing and this moved its core down, as shown in Fig. 29, so that contacts 418a are separated. This opened the circuit through relay 408 and thus opened all other circuits which pass from main line 390 through contact points 408c through motor 344 and through line 419 and contacts 420a. All of the now closed circuits are opened and all parts will return to neutral or inoperative position. The circuit to motor 344 is opened and this motor now stops and arm 347 will be in the position shown in Fig. 29. All parts have now been returned to neutral or inoperative position. The tabulation has been made and the number 97385 is now displayed on the totalizer unit having code number 964. The number 97385 and code number 964 have been printed on tape 325. It may be further pointed out that during a plus operation when a totalizer unit 90 is pushed into operative or rack engaging position that only one set of code contacts 136a, 168 and 169a, will be engaged. The engaging of these contacts complete a circuit through the code solenoids 321 for that particular locked-in totalizer. The contacts on fingers 148 and 149 which engage contacts on bars 100, 100a and 103, 103a are not in engagement during the locking-in of a totalizer unit 90. The engagement of contacts on fingers 148 and 149 with said bars 100, 100a, and 103, 103a is only completed when the cam 90j2 engages 90e1 which operates the push rods 181 and 181a. When any alining contact on one of the bars is engaged by its adjacent contact fingers a circuit is completed through the solenoid for that circuit. These bars and contact fingers when engaged close individual circuits through solenoids 217, 218, 219 and 220. As explained, actuation of these solenoids move upwardly their respective drive racks 213, 211, 214 and 212, one tooth spacing when the numeral 0 of any one of the numbering wheels in a locked-in unit 90 has completed a turning cycle, or has been rotated to, or through an 0 reading. Thus, as an example, the digit wheel completing a rotation to or through the 0 reading will close a circuit through the solenoid 217 which will turn the ten wheel 1 tooth spacing or from the numeral previously shown on the display position, to one number in advance of such previously displayed.

Referring to Figs. 30, 31 and 32, in Fig. 30, the numbering wheels are shown as all displaying the "0" numeral. In Fig. 31, the numbering wheels are shown as displaying the number 97385, the tabulation operation which has been set forth. If it is now desired to add 6 to the amount shown in Fig. 31, the numbering wheel at the right having the numeral 5 thereon would be moved the distance of six spaces and this would produce the sum shown in Fig. 32. The wheel 90j at the right has during its rotation through six spaces completed a full revolution since the number "0" has again appeared thereon. The cam disk 90j1 secured to said numbering wheel 90j at the right was rotated and its projection 90j2 engaged spring finger 90e1 and closed the contacts last mentioned above to operate the respective solenoid 217 of solenoids 217, 218, 219 and 220. This moves the numbering wheel next to the right-hand wheel, as shown in Figs. 30 to 32, one space so that the number 9 is now displayed on said wheel, which is the second from the right as shown in said figures.

A complete plus tabulating operation has now been described. The operation of a minus tabulation of the device will now be described. When a minus operation is to be performed or a number subtracted from a number displayed on a totalizer unit, the switch arm 328 will now be turned counter-clockwise, as shown in Figs. 25, 29 and 37, so as to engage the contact or pole 328b.

Assuming that the number 97385 which was tabulated is still displayed on the totalizer unit having the code designation 964, this amount will be used in the minus tabulation. The operation of subtracting numbers is different from that of adding totals or numbers to a totalizer unit. In the minus operation a totalizer unit 90 will not be pushed into its operative or rack-engaging position until the operating racks 128 to 132, inclusive, are elevated from their neutral, lower or normal resting position a number of tooth spacings which corresponds to the number which is to be tabulated or subtracted. For example, if the number 25 is to be subtracted from the number 59, only the racks 128 and 129 would be elevated. The rack 128 would be raised the height of five tooth spacings while the rack 129 would be raised to the height of two tooth spacings. After the racks have been thus elevated, the totalizer unit 90 would be pushed in and locked in by its keys 111. The racks 128 and 129 would then be released by operation of solenoids 216, and 222 to 225 inclusive, and the racks would move downwardly to their normal or neutral position. This downward movement of the racks 128 and 129 would turn the digit numbering wheel 90j at the right respectively five tooth spacings backwards, and the ten numbering wheel two tooth spacings backwards. The reading would now be 34 in the two wheels at the right of a unit totalizer. If the number 97385 were to be subtracted from the number 97385 now appearing on totalizer unit 964 the rack 128 woud be elevated five tooth spacings, the rack 129 would be elevated eight tooth spacings, the rack 130 would be elevated three tooth spacings, the rack 131 would be elevated seven tooth spacings and the rack 132 would be elevated nine tooth spacings. The totalizer unit having the 97385 reading would then be pushed in to rack-engaging position, the racks released and the racks would move downwardly turning all the numbering wheels backward the stated number of tooth spacings respectively so that the unit would now display 0–0–0–0–0.

It is believed it will not be necessary to describe the operation of rotary device 345 in the movement of arm 347 with its lug 347a through the groups of open and closed contacts in said switch which represent the digits, tens, hundreds, thousands and ten thousands in the tabulation. The racks are elevated, as described in the plus operation, by actuations or pulsations of the solenoids 215, 217, 218, 219 and 220. The electrical circuits to the code solenoids are exactly the same as in the plus circuit already described. The circuits for the code number 964 will be closed when the contact 167a engages 169a, and contact 168 engages 136a on strip 136.

The four solenoids 228, 229, 230 and 231 are used in the minus tabulation. These solenoids were not used in the plus tabulation. They replace the circuits which were closed from contacts 100b, 100c, 103, 103a and 148b when spring fingers 148 and 149 are moved by the push rods 180, 181 and 181a.

In the minus operation the switch arm or pole 328 engages contact or pole 328b, as stated, and arms 340, 341, 342 and 343 respectively engage the contacts 340b, 341b, 342b and 343b, as shown in Fig. 37. This directs the circuit through the solenoids 228, 229, 230 and 231. The new circuits through solenoids 228 to 231, inclusive, will momentarily be completed when contacts 100b, 100c, 103 and 103a are engaged by the contacts on spring fingers 149 and 148 respectively. The engagement of contact 148a with its contact 100b on bar 100 momentarily closes a circuit through switch arm or pole 340, contact or pole 340b, to solenoid 228 and to line 400. This energizes solenoid 228 and permits actuating rack 214 to drop down below its ordinary neutral or lower position the distance of one tooth space, as shown in Fig. 4. This operation of the solenoids 228, 229, 230 and 231 occurs when any one of the numbering wheels 90j of a totalizer unit completes one revolution or has been rotated from "0" to a zero reading.

During the minus tabulation said last mentioned solenoids must be held in circuit and energized until after the racks 128 to 130, inclusive, have been elevated as desired and released to move to their lower position. This holding of the solenoids in energized position thus provides means or opportunity for allowing any particular rack to drop down one tooth space beyond normal neutral or lower position when one of the disks 90j1 and its lobe 90j2 functions. In order to maintain said last mentioned solenoids in said energized condition, contact fingers 228d and 228e are provided, as shown in Fig. 4. One of these contacts, as shown in Fig. 29, is connected to the incoming line of its solenoid while the other contact finger receives current from the line 474 which connects to the line 419. The current will thus pass from line 419, through line 474 to one of said contacts, such as 228d, through the other contact, such as 228e, through the coil such as 228, to return line 400. Said solenoids 228, 229, 230 and 231 when energized, will thus remain energized until after the racks 128 to 132, inclusive, have been elevated and released. Said solenoids will in fact be held energized until contacts 418a are finally opened, as has been above explained. As indicated on Fig. 29, each solenoid is provided with a pair of contacts 228e, 228d, 229e, 229d, 230e, 230d, 231e and 231d. These are the same as the contacts 228e and 228d, as shown in Fig. 4. This holding means for the solenoids 228 to 231, inclusive, provides the means for the racks 211, 212, 213 and 214 to drop by gravity one tooth spacing beyond neutral position when their respective solenoid is energized. During a minus tabulation if the solenoid 228 is energized it allows the racks 128 to drop downward one tooth spacing beyond neutral stopping position. The numbers in the digit column wheel of each unit control the operation of the solenoid 228 and the racks 129 which are in the tens column. Solenoid 229 controls the 130 racks which are in the hundredths column. Solenoid 230 controls the 131 racks which are in the thousandths column and solenoid 231 controls the 132 racks which are in the ten thousandths column.

Thus regardless of the numbering wheel in a totalizer unit which is being turned, when it has made one revolution backwards or has been rotated from "0" reading to "0" reading it will close its cooperating contact and energize the solenoid which affects the value of the next advanced column numbering wheel thus turning it backward one tooth spacing. The contact is closed of course by the lobe 90j2 on the disk 90j1. The digit numbering wheel 90j will through its disk 90j1 close a circuit through the contact finger 148a which energizes the solenoid 228 which causes its cooperating mechanism to turn the ten numbering wheel backward one tooth spacing. In like manner the numbering wheel 90j for the tens column will close a circuit through the contact finger 149a and turn the numbering wheel 90j in the hundredths column backward one space. The hundred wheel will affect the thousandths wheel and the thousandths wheel will effect the ten thousandths wheel.

The arrow on the handle 328 of the switch dial as heretofore stated having been turned to minus position with arm 328 engaging post 328b, the minus keys 306 having the numbers 9–7–3–8–5 thereon in their respective columns having been depressed, said keys close their contacts at 308a and 310, as shown in Fig. 27, and this opens the contact arms 9–HA, 7–GA, 3–FA, 8–EA, 5–DA of the R–10 relays, as already described.

A switch 480 shown on member 300 in Fig. 25 is provided and this is now momentarily closed. Referring to Fig. 29, this switch is shown at the upper left-hand portion immediately below the showing of the keys 306. This switch momentarily closes a circuit from line 481 through switch post 625 and arm 480 through line 482 through a pair of contacts 408a and 408b, then out through line 410, through all of the R–10 relay coils and through the relay 412, closing the contacts 412a and 412b and setting up operating circuits through motor 344 and the hold-in relays 216, 222, 223, 224 and 225, as well as all the other circuits that were completed when the totalizer unit was locked-in during a plus operation as previously described.

In a minus tabulation the switch 480 is the means for closing the circuits through the R–10 relay coils because the totalizer unit 90 which closes the same circuit during a plus operation is not yet pushed in. It will be remembered that the totalizer unit in a minus operation is not pushed in until all of the racks 128 to 132 have been elevated. When the push button switch 480 was depressed and released the circuits through the R–10 relay coils which energized the coil 412 also opened or separated the contacts 408a and 408b, thus opening the original circuit through the R–10 relay coils, but the contacts 308a and 310 which were closed on the keys 306 by depressing the keys 9–7–3–8–5 maintained a circuit through the coils 5–D, 8–E, 3–F, 7–G and 9–H by means of the current from line 481 through contacts 5–A, 5–D, etc. of the R–10 relay coils.

The closed contacts through the digits, tens, hundredths, thousandths, and ten thousandths contact sectors or groups of contacts in rotary device 345 are the same contacts that were closed in the plus operation when registering the number 97385 and it is thought these circuits need not further be described in connection with arm 347 and lug 347a. The motor 344 revolves the arm 347 through the said groups of contacts and the racks 128 to 132, inc. will be elevated a distance in teeth spacing of said racks equal to the number being tabulated. The arms 347 having passed all of the groups of contacts now passes by contacts 378 and 379 without closing any circuits. These contacts operate only in a plus tabulation and are now in an open circuit. The contacts 380 are momentarily closed or engaged, energizing relay coil 420, separating contacts 420a and making a contact at contact 420b thus stopping motor 344. The circuit from contact 380 includes line 390, arm 328, post 328b, line 390, contacts 380, line 483, through coil 420, out line 484, through the green lamp 332, through a switch 485 which is a push button switch on member 300, through the coil of relay 486, through line 487 to return line 400.

When the lug 347a closed the contacts 380, the overrun on motor 344 carried said lug beyond said contacts allowing the same to separate or open again and the circuit for coil 420 then came through line 419, through the now closed contacts 420b, through coil 420, out line 484, through green light 332, closed switch 485, through coil 486 and out line 487 to line 400. This circuit closed contacts 486a for line 488 and also left open a circuit through contacts 420a which stopped motor 344. As stated, motor 344 drives shaft 346 and arm 347. The green light is now on which informs the operator the parts are now in position for receiving a totalizer unit.

The totalizer unit 90 is now pushed in and it is locked by its lock bar key 111. The contacts are made at 168 and 169a to bar 136. This closes the circuit for code solenoids 9–C, 6–C and 4–C for the code number 964, which circuit extends from line 390 through bar 136, through contacts 136a of bar 136, through contacts 168 and 169a, through coils 9–C, 6–C and 4–C to line 407, then through line 488, through contacts 486a and then out through line 487 to line 400. The push button switch 480 is now in open circuit. Thus line 481 to line 482 is open and the above circuits to the code solenoids will now be completed through line 488, contacts 486a and line 487 to line 400.

With the totalizer unit 90 locked in for operation and the code solenoids for the numbers 964 energized, the circuit through said code solenoids will now be open extinguishing lamp 332 and again starting motor. This will be done by opening push button switch 485. Switch 485 being momentarily opened opens the circuit from line 419 through the now closed contacts 420b, coil 420, through light 332 and coil 486, thus breaking this closed circuit and re-establishing the circuit through the normally closed contacts 420a to motor 344 and out to line 400.

The motor 344 is now again started and turns arm 347 and lug 347a, which latter closes the contacts 381 which allows a circuit to be closed from main line 390 through arm 328, post 328b, line 390, the momentarily closed contacts 381, out through line 470, through coil 422 and to line 400. Coil 422 is energized and this separates the contacts at 422a and engages the contacts at 422b thus opening the circuit from line 419a, through the contacts 422a and through the hold-in solenoids 216, 222, 223, 224 and 225. When said solenoids are de-energized the holding pawls on the actuating racks 210, 211, 212, 213 and 214 are withdrawn and this permits all of the racks 128 to 132, inc. to drop down from their now elevated position to their normal lower or neutral position. This downward movement of said rack bars 128 to 132, inc. causes them to rotate their number engaging wheels 90j of the locked in totalizer unit 90 thus turning said wheels backward to the numbers 0–0–0–0–0. After the contacts 381 are opened by the passing of lug 347a, the circuit for coil 422 will come from line 419a through the now closed contacts 422b, through coil 422 and to line 400. Contacts 422a and 422b must first make or engage and then break or separate.

The lug 347a continues its movement and will now momentarily close contacts 382, which closes a circuit through line 490, line 469, through solenoids 174 and through line 491 to line 400. This energizes the solenoids 174 so that bar 107 is raised and the locking keys 111 are raised to release the locked in totalizer unit 90 which is now returned to its outward position as described in connection with the plus operation. Lug 347a now engages contacts 383 which closes a circuit through motor 335 as above described. Motor 335 releases the keyboard keys on member 300 and prints the code number on tape 325 and the amount 97385 in the minus column on the tape 325.

Lug 347a now engages momentarily the contacts 384 thus closing a circuit through line 390, contacts 384, line 473, coil 418 and through line 414 to line 400. This actuates coil 418 and separates contacts 418a thus opening the circuit to motor 344. Motor 344 is now stopped and this stops the rotation of arm 347. All parts are now returned to neutral as explained above in the plus operation. If any of the solenoid coils 228, 229, 230 and 231 are energized during the minus tabulation as described, the opening of contacts 418a when solenoid 418 is energized breaks the circuit through line 419 thus opening the circuits through the solenoids 228, 229, 230 and 231, which automatically opens the circuits through their cooperating contacts 228d, 228e, 229d, 229e, 230d, 230e, 231d and 231e. The minus tabulation has now been completed and all parts are returned to normal position.

It is again stated that in a plus or addition tabulation when one of the numbering wheels 90j and its disk 90j1 completes a revolution it adds one to the next column of the adjacent wheel which is next higher in value. The digit wheel will add one to the tens wheel, the tens wheel will add one to the hundredths wheel, and the hundredths wheel will add one to the thousandths wheel, etc. In a minus or subtraction tabulation however, the digit wheel after one complete revolution backwards will take or subtract one from the tens wheel, and the tens wheel will take or subtract one from the hundredths wheel, etc.

Figure 40:
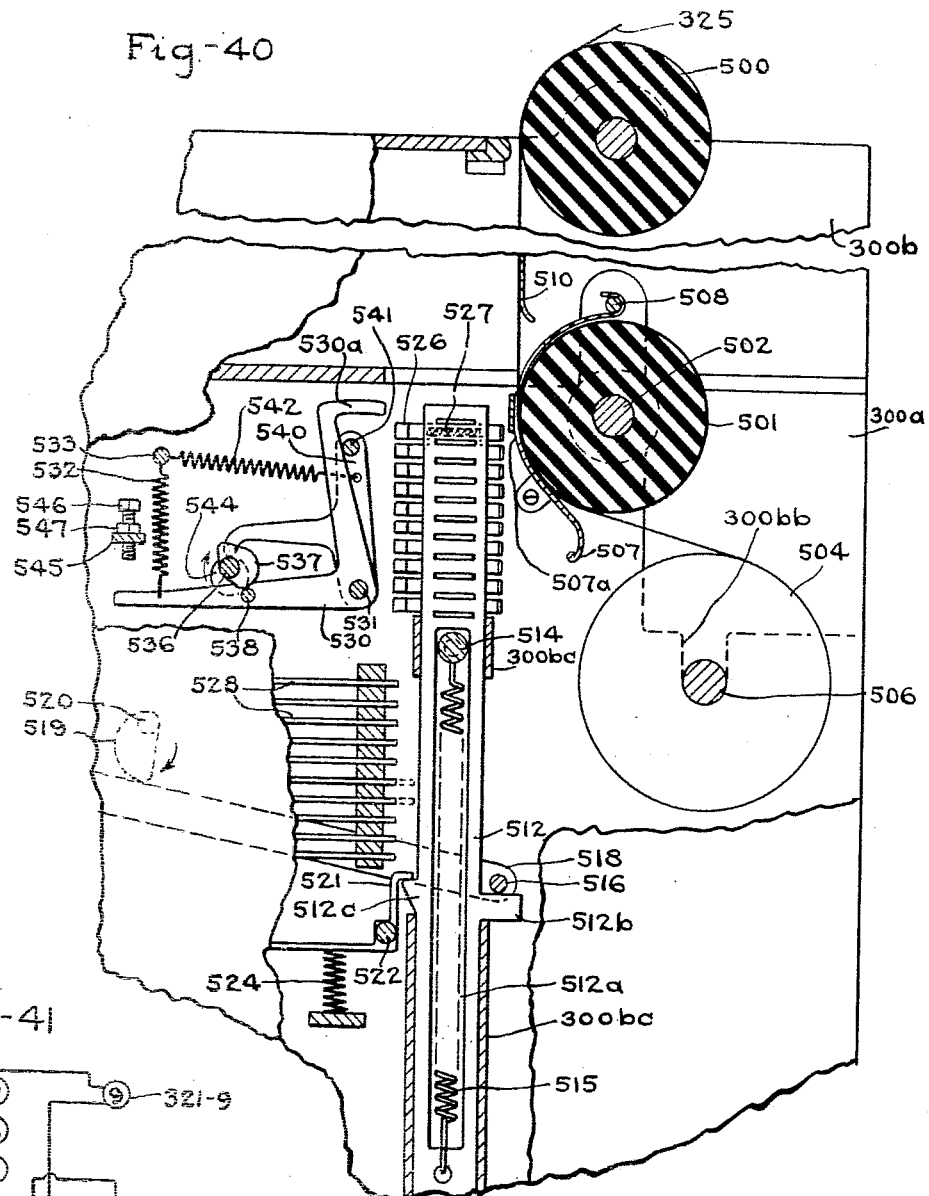
Fig. 40 is a vertical section illustrating the printing mechanism.

While different means for printing could be used, many of which are now known in the prior art in adding and similar machines, one structure is illustrated in Fig. 40. Referring to Fig. 40 the tape 325 is shown running over a roller 500 and over a printing platen roller 501. Roller 501 is carried on a shaft 502 which will be suitably journaled in the casing 300b. Tape 325 is supplied from a roll 504 supported on a shaft or rod 506 which rests in the bottom of a slot 300bb in casing 300b. A plate 507 is bent at one end to hook over a pin 508 supported in casing 300b and said plate extends around a portion of the platen roll 501 and has a lower handle-forming end. Said plate has an opening 507a which exposes the tape 325. A guide plate 510 is shown for tape 325 above roller 501. A series of members or vertically extending bars 512 are provided and there will be one of these for each row of the keys 306, 320 and 321. Bars 512 are provided with elongated slots 512a through which extends a rod 514 suitably supported at its end in casing 300b. Tensile coiled springs 515 are secured at one end to rod 514 and at their other ends to one of the bars 512 respectively. Bars 512 each have projecting rearwardly therefrom a lug 512b. A rod 516 extends transversely above the lugs 512b, said rod being carried at its ends in swinging arms 518. Arms 518 will be engaged by eccentrics 519 secured to and rotatable with a shaft 520. Shaft 520 will be rotated by suitable gearing (not shown) when motor 335 is operated. Each of the bars 512 has a forwardly projecting lug 512c having a horizontal top portion adapted to be engaged by the lip of a stop member 521 which is swingably mounted on a shaft 522 mounted in casing 300b. Member 521 is urged to its stop position by a compression coiled spring 524. It will be seen that if rod 516 is raised and stops 521 withdrawn, that the bars 512 will be elevated by the springs 515. Bars 512 will be provided with suitable guides 300bc and each bar has slidably therein and extending transversely thereof a type bar 526. These type bars are held in the position shown in Fig. 40 by compression coiled springs 527. They can be moved to the right as shown in said figure and will be returned to the position shown by the springs 527. Disposed in front of the bars 512 and in spaced superposed relation are a plurality of bars 528. These bars are connected to the keys 301, 306 and 320 so that when one of said keys is depressed, one of said bars is moved toward the bars 513, as shown in the dotted line position of some of said bars. Above the bars 528 are mounted a plurality of bell crank levers 530 swingable about a rod 531 suitably mounted in casing 300b.

Levers 530 have one arm extending in a general vertical direction and provided at its other end with a hammer portion 530a. Each lever 530 has a substantially horizontal arm to which is connected one end of a tensile coiled spring 532 connected at its other end to a stationary rod 533 secured in casing 300b. A shaft 536 is journaled in casing 300b and adapted to be driven through suitable gearing or connections by motor 335. Shaft 536 has secured thereto a plurality of cams 537 each of which is adapted to engage a rod 538 which extends through the levers 530. Two or more levers 540 are also provided swingable about rod 531 and have supported thereon and extending therebetween a rod 541. Levers 540 have connected thereto respectively tensile coiled springs 542 which are connected at their other ends to a rod 533. Shaft 536 also carries an eccentric 544 adapted to engage a forwardly extending arm of levers 540. A bar 545 is supported in casing 300b, and screws 546 are threaded into said bar and extend therebelow in position to be engaged by the horizontal arms of levers 530. Screws 546 are shown as provided with locking nuts 547.

In operation the type bars 526 will normally occupy the position shown in Fig. 40. When a plus or adding operation is being performed and keys 301 and 320 are operated, the bars 528 corresponding to the keys depressed will be projected into the dotted line position. When motor 335 is operated, shafts 536 and 520 will be rotated. Rod 516 will be lifted out of engagement with lugs 512b by rotation of eccentrics 519. Each key 301, 320 and 306 has and operates in combination therewith a member 521 which will be oscillated about shaft 522 (by means not shown) when its corresponding key is depressed so that only those stops for the keys depressed will be moved out of engagement with lugs 512c when this occurs, springs 515 will move upwardly only those key bars 512 which have thus been released until lug 512c engage the bars 528 which have been moved rearwardly. This will bring the desired type bar into printing position relative to plated roll 501.

Figure 41:
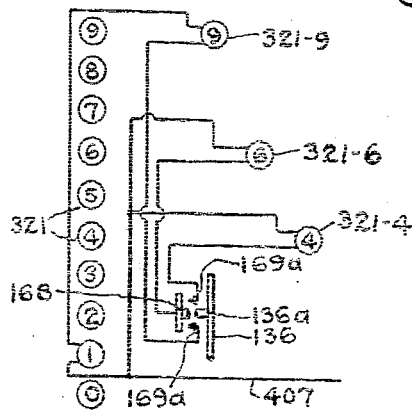
Fig. 41 is a schematic wiring diagram illustrating the method of using one or more extra keys.
Figure 42:
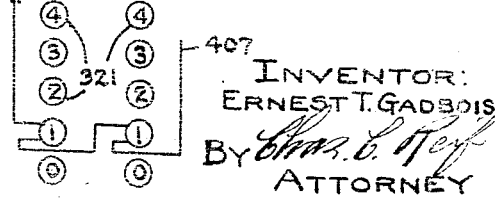
Fig. 42 is a partial view similar to Fig. 41 showing the use of extra keys.

The type bars 526 will be numbered from 0 to 9. As motor 335 continues to operate, eccentric 544 will be moved by shaft 536 and levers 540 will be swung in a clockwise direction to move the rod 541 away from levers 530. Cam 537 will be rotated with shaft 536 and when one substantially radial or steep portion of this cam passes rod 538, the levers 530 will be swung clockwise rapidly by springs 532. The type bars which have been brought to printing position will be in horizontal alinement with the hammer portion 530a and will receive an impulse from said portions which will move them against the resistance of springs 527 to print on the tape 325. As eccentric 544 continues its rotation, springs 542 will move levers 540 anti-clockwise to move rod 541 forwardly, and levers 530 will be moved to normal or inoperative position. The screws 546 form stops for levers 530 to prevent too much movement thereof in a clockwise direction. Rod 516 will be moved downwardly and the bars 512 will be moved downwardly against the resistance of springs 515 until stops 521 spring over the tops of lugs 512c. The parts are thus brought to normal position. The code number and the tabulated number have now been printed on tape 325. In Figs. 41 and 42 are shown fragmentary wiring diagrams which illustrate how the code numbers can be increased without increasing the number of contacts at 168 and 169a. In Fig. 40 the rows of keys 320 and solenoids 321 have been increased to four instead of three as shown in Fig. 25. In the specification it has been illustrated how the code number 964 is printed on the tape 325. With an additional row of keys added, the code numbers can be increased from 999 to 9999. In Fig. 41 the wiring connection shows that code number 964 will now read 1964 because the solenoid 321-9 is connected in series with the number one solenoid of the added fourth row of keys 320 and solenoid 321. It can be readily understood that the code number can now be any number from zero to 9999.

In Fig. 42 the illustration shows that two rows of keys 320 and solenoids 321 have been added thus the code number can be any number from 0 to 99999. The solenoid 321-9 is shown connected in series to the number one solenoid in both the new rows of added keys and solenoids, thus the code number of Fig. 42 will read 11964. The connections from the original three rows of code solenoids to the new rows of solenoids can be varied so that any combination of code numbers can be made from the three point contacts at 136, 168 and 169a. It can readily be understood that adding more rows of keys and solenoids at 320 and 321 makes it possible to increase the code numbers to any number desired.

From the above description it will be seen that I have provided a machine or device by means of which certain information such as various sums designated by code numbers can be constantly displayed for the information of those concerned. If the device were used for displaying current supply or invoices on hand of various articles, the code number would represent the article and the number displayed would show the number of said articles on hand or in stock. When some of the articles were used a minus tabulation would be made and this would reduce the number displayed. If new stock were secured of said article then an addition operation would be performed and the new number tabulated would show the new invoice or number of articles on hand. The device could be used to display currently the condition of certain accounts in a bank or in a broker's office. It will thus be seen that the device will have a wide range of application. As many of the display boards as necessary could be used and grouped about the person who would wish to consult the totals displayed. The device can be made very compact and the operating mechanism housed in a comparatively small case. The device is easily operated and would not necessitate long training for an operator. It will be apparent that the device will have a high degree of utility for the purpose intended.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device of the class described having in combination, a display panel having mounted therein a multiplicity of units, each unit comprising a plurality of members, said members carrying spaced numerals from 0 to 9, said units being slidable toward and away from said panel to operative and inoperative positions respectively actuating elements for said members respectively for moving the same to display different numbers, a manually operated control means for each unit for moving said units toward said panel for placing said units and members in operative engagement with said actuating elements, and locking means for holding said unit in such engagement.

2. The structure set forth in claim 1, means for releasing said locking means, and automatically operating means for returning said unit to normal inoperative position.

3. A machine of the class described having in combination, a display panel having a multiplicity of units mounted therein and arranged in vertical rows, each unit comprising a plurality of members carrying spaced numbers from 0 to 9, one number on each member being in display position and the numbers in display position on said unit being in such alinement as to display a certain sum, a control device having sets of separated contacts and ten pairs of engaged contacts, each set comprising ten pairs of contacts, a movable member for said device movable successively to engage the contacts of said pairs for engaging said separated contacts and separating said closed contacts, a keyboard having rows of keys one for each set of contacts, said keys in one row being numbered 0 to 9 respectively, each set of said pairs corresponding to the keys in one of said rows and electrically operated means operating when a key on said keyboard is operated to cause said movable member to engage the contacts of a number of said pairs in one of said sets equal to the number on said key and open the contacts of said engaged pairs, and electrically operating means actuated by engaging of said contacts to move said members a number of steps equal to the number on said key and means operated by a separation of said pair of engaged contacts corresponding to the number of the operated key for rendering ineffective the engagement of the remainder of the separated contacts in said sets.

4. A machine of the class described having in combination, a panel, a multiplicity of units mounted in said panel, each unit comprising a plurality of members each carrying numerals from 0 to 9, one numeral of each member being in display position and the numerals in display position being in such alinement that a certain sum is displayed, a control device having sets of contacts, each set comprising ten pairs of contacts, a motor driven movable member for said device movable to successively engage the said contacts of said pairs, a keyboard having rows of keys, one row for each set of said contacts, said keys in each row being numbered 0 to 9 respectively, the keys in each row corresponding to the pairs of contacts in each of said sets respectively, an electrically operated means operated when a key on said keyboard is operated to cause said movable member to open and close a number of contacts in one of said sets and operate a number of circuits equal to the number on said key for moving said first mentioned members to display said sum and a circuit closed by operation of said key for rendering inoperative the action of said movable member on the remainder of said contacts in each of said sets.

5. A machine of the class described having in combination, a display panel, a multiplicity of units mounted in said panel, each unit comprising a plurality of members each carrying numerals from 0 to 9, one numeral of each member being in display position and the numerals in display position being in such alinement that a certain sum is displayed, a device having sets of pairs of spaced contacts, said sets corresponding respectively to the units, tens, hundreds, thousands digits, etc. in the number displayed by one of said units, each set comprising ten pairs of spaced contacts, said device comprising a motor driven movable member for successively engaging said contacts on said pairs of contacts, a circuit closed when each of said pairs of contacts are engaged by said movable member, a pair of normally closed contacts for each of said sets, means for opening said last mentioned contacts after said movable member has passed a certain number of the pairs of contacts in one set said last mentioned number being the number to be displayed to cut off any further current from said one set whereby only a number of said pairs are effective equal to the number on said key.

6. A machine of the class described having in combination, a panel, a multiplicity of units mounted in said panel, each unit comprising a plurality of movable members each carrying numerals from 0 to 9, one numeral of each member being in display position and the numerals in display position being in such alinement that a certain sum is displayed, and a device having sets of pairs of spaced contacts, said sets being equal in number to the digits in said sum each set comprising ten of said pairs, said device comprising a member movable to contact and successively engage said contacts in said pairs of contacts, a keyboard having rows of keys, one row for each set of contacts, said keys in each row being numbered 0 to 9, the number of said pairs in each set corresponding to the numbers of the keys in said rows respectively, electrically operated means actuated when a key on said keyboard is operated to cause said movable member to engage and connect a number of contacts in one of said sets equal to the number on said depressed key, an electrically operated means for moving said members step by step by a circuit closed as the contacts of each of said pairs of contacts are engaged for giving impulses to said last mentioned means to move said members step by step.

7. A machine of the class described having in combination, a panel, a multiplicity of units mounted in said panel, each unit comprising a plurality of members each carrying numerals from 0 to 9, one numeral of each member being in display position and the numerals in display position being in such alinement that a certain sum is displayed, means for moving said members step by step a distance between two adjacent numbers, a keyboard having rows of keys, said rows being equal to the number of digits in said sum, the keys in each row being numbered 0 to 9, a device having sets of pairs of spaced contacts, said sets being equal to the number of digits in said sum, a motor driven movable member for said device adapted to close a number of said contacts in said pairs when a key on said keyboard is depressed, said number equaling the number on said key, circuits closed by engagement of said last mentioned contacts and means actuated by the closing of said circuits to cause said first mentioned means to move said members respectively a number of steps equal to the number on said operated key.

8. A device of the class described having in combination, a display panel having mounted therein a multiplicity of units, said units being arranged in vertical rows and being positioned at and accessible at the front of said panel for movement inwardly and outwardly of said panel, each unit comprising a plurality of members and each member carrying thereon numerals from 0 to 9, a movable element for moving one member of all of said units in one row, electrically operated means for moving said element, a member for each unit manually movable to move said unit to operative position to connect a desired unit with said movable element.

9. A device of the class described having in combination, a display panel having a plurality of vertical rows of units movably mounted therein, each unit comprising a plurality of vertically alined members each carrying numbers from 0 to 9, one of said members of each number being in display position and the numbers in display position on the members of the unit being alined to display a certain sum, each of said units being accessible at the front of said panel a second member adjacent each unit adapted to be moved inwardly and outwardly of said panel by the operator for placing said unit in an operative position, a keyboard having a plurality of rows of depressible keys, the keys in each row carrying numbers from 0 to 9 respectively, there being a row of keys for each member of one of said units, electrical contacts engaged when a key is depressed, a circuit including said contacts, and electrically operated means in said circuit for moving said first mentioned members in the unit to display the desired sum.

10. A device of the class described having in combination, a panel having mounted therein a multiplicity of units, each unit being bodily movable inwardly and outwardly of said panel substantially at right angles thereto carrying a plurality of rotatable wheels, each wheel carrying on its periphery circumferentially spaced numerals from 0 to 9, said units and the respective wheels thereof being arranged in vertical alinement, vertically movable members fixed against transverse movement arranged to turn respectively each set of vertically alined wheels when said units are in operative position, electrically actuated means for moving said members, a keyboard having rows of keys corresponding in number to the number of said wheels in one of said units, the keys in each row being numbered from 0 to 9, a pair of contacts engaged by each key when depressed, a circuit including said contacts, and a rotatable contact member electrically connected to said keys for closing circuits for actuating said first mentioned means.

11. A device of the class described having in combination, a large display panel having a multiplicity of units mounted therein, each unit comprising a plurality of rotatable members carrying numbers from 0 to 9, one number on each member being in display position and the numbers on said members in display position being in such alinement as to display a certain sum, vertically movable actuating members for moving said members respectively to cause one of said units to display different numbers, a keyboard having rows of depressible keys, said rows equaling in number the number of said members in one of said units, the keys of each row being numbered from 0 to 9 respectively, a contact member having sets of pairs of contacts, said sets corresponding to the digits in said sum and said pairs corresponding to the keys in each of said rows, a driven member movable to engage and successively move the contacts of said pairs together and a solenoid-actuated pawl given an actuation by the closing of the contacts of each of said pairs for causing said actuating members to move a successive number of strokes to move their respective members in a unit a certain number of steps equal to the numbers of said depressed keys respectively.

12. A device of the class described having in combination, a display panel having mounted therein a multiplicity of units, each unit comprising a plurality of rotatable wheels having numerals from 0 to 9 on their peripheries, one numeral of each member being in display position and the numbers on said wheels in display position being in such alinement as to display a certain sum, a plurality of actuating members for said wheels respectively, said units being bodily movable to operative or inoperative positions, a member for each unit manually operable for moving said unit to operative position, said units being exposed and accessible at the front of said panel means for moving said unit to inoperative position, an electrically actuated means for causing said actuating members to turn the wheels of said unit which was moved to operative position.

13. A device of the class described having in combination, a display panel, a multiplicity of units mounted therein, each unit comprising a plurality of rotatable wheels having numerals from 0 to 9 on their peripheries, one numeral of each member being in display position and the numbers on said wheels in display position being in such alinement as to display a certain sum, said units being manually movable from the front of said panel inwardly and outwardly of said panel to operative and inoperative positions respectively a plurality of movable racks each being adapted to turn all of the vertically alined wheels in a vertical row of said units, a member on said unit manually movable to move said unit inwardly toward said panel into operative position to engage said wheels with their respective racks, actuating racks for said racks, holding means for said actuating racks and electrically operated means for operating said holding means.

14. A device of the class described having in combination, a large display panel having a multiplicity of units mounted therein, each unit carrying a plurality of rotatable members carrying numbers from 0 to 9, one number on each member being in display position and the numbers on said members in display position being in such alinement as to display a certain sum, means for moving said members to indicate a desired sum, each of said units being located to be manually movable inwardly of said panel to an operative position and outwardly to an inoperative position, a code number for each unit displayed adjacent the same, a keyboard having a plurality of rows of keys, each row having depressible keys numbered from 0 to 9, the numbers of rows being equal to the number of digits in said code number, electrically operated means for depressing each key, contacts closed by said units respectively when moved to operative position, circuits including said last mentioned means and contacts whereby when a unit is moved to operative position its code number is formed by the keys depressed by said last mentioned means operated by said circuits.

15. A recording and display device having in combination, a display panel comprising a multiplicity of units arranged in vertical and horizontal rows, each unit carrying a plurality of rotatable members, each carrying numbers from 0 to 9, one of said numbers being in display position and said numbers which are in display position being in alinement so that a certain sum is displayed, said units being arranged to be manually movable respectively inwardly and outwardly relatively to said panel to operative and inoperative positions, said members each haivng a gear movable therewith, a rack for moving said gear electrically operated means for moving each of said members, a second gear, a vertically movable rack operating said second gear, said last mentioned gear and rack being in constant mesh, said first mentioned gear being brought into mesh with said first mentioned rack when said unit is moved to operative position.

16. A recording and display machine having in combination, a display panel comprising a multiplicity of units arranged in horizontal and vertical rows, each of said units being movable inwardly toward said panel into operative position and outwardly to inoperative position, each unit carrying a plurality of rotatable members each carrying numbers from 0 to 9, each one of said numbers being in display position and said numbers in display position being in such alinement that a certain sum is displayed, a code designation for each unit adjacent the same, said designation comprising a number of characters, a keyboard having rows of keys so that there is a row for each of said characters in said designation, contacts closed when said unit is moved inwardly to operative position, a solenoid for each of said last mentioned keys and a circuit closed by said contacts including said solenoids, whereby said last mentioned keys having the characters forming said designation of said unit are operated.

17. A recording and display machine having in combination, a display panel having openings therein, a multiplicity of units respectively disposed in said openings, each of said units being bodily movable in said openings inwardly and outwardly of said panel to operative and inoperative positions respectively, each of said units carrying a plurality of movable members each carrying numbers from 0 to 9 respectively, each member being adapted to be moved step by step to display one number with said numbers of said unit in horizontal alignment so that a certain sum is displayed by said unit, a keyboard having rows of keys so that there is a row for each member of one of said units, the keys in each of said rows carrying numbers from 0 to 9 respectively, a rotatable contact member having groups of contacts corresponding to the tens, hundreds, etc. positions of the digits in said sum, each group having ten pairs of contacts, a driven rotatable member movable to successively engage the contacts of each of said pairs, an electrical circuit including a conductor from each of said keys to a pair of said contacts corresponding to the number on said key and its position in said sum, said circuit rendering the engagement of said contacts of said pairs beyond the number on said key ineffective, and an actuating means given impulses to move said members a number of times equal to the numbers on said key as said pairs of contacts are engaged for moving said members step by step.

18. The structure set forth in claim 17, and a member adjacent each unit, the same displaying a designating code character for identifying said unit.

19. The structure set forth in claim 17, a member adjacent each of said units, the same bearing a code designation of several characters, said keyboard having additional rows of keys with said characters thereon respectively corresponding to the characters of said code designation, means for actuating said keys when said unit is moved to operative position, and means for printing said code designation upon a tape after said keys of both sets carrying said characters are depressed.

20. A device of the class described having in combination, a display panel having mounted therein a multiplicity of units arranged in spaced vertical rows for displaying sums, each of said units carrying a plurality of members and being movable inwardly and outwardly in said panel to operative and inoperative positions respectively, said members carrying spaced numerals from 0 to 9, actuating elements for said members respectively comprising a plurality of racks equal in number to said members for moving the same to display different numbers, a manually operated means for each unit for moving the same to operative position and placing said units and members in operative engagement with said racks, and locking means for holding said units in such engagement, said units being accessible for said manual movement at the front of said panel.

21. The structure set forth in claim 20, said locking means comprising a key for each of said units, said units each having a slot into which said key moves means for releasing said locking means and automatically acting means for returning said units to normal inoperative position.

22. A device of the class described having in combination, a large display panel having a multiplicity of units mounted therein, said units being arranged in vertical rows, each unit carrying a plurality of rotatable members carrying numbers from 0 to 9, one number of each member being in display position and the numbers on said members in display position being in such alignment as to display a certain sum, a keyboard having rows of keys, the keys of each row being numbered from 0 to 9 respectively, a relay for each of said keys, a circuit closed through said relay when a key is depressed, a contact device having groups of pairs of contacts, said groups corresponding to the units, tens, hundreds, and thousands, etc. positions of the digits in said sum and the pairs of contacts in each group corresponding to the number of keys in each of said rows, a motor driven member movable relatively to said pairs for successively moving and engaging the contacts of each pair, a pair of engaged contacts arranged to be separated by said driven member a conductor of said circuit extending from each key to a contact of each of said pairs, an impulse actuating member, said circuit including said conductor and engaged contacts for giving said actuating member a number of impulses equal to the number on said key and the number of said pairs actuating said impulse member, for turning said wheels a circuit including said pair of engaged contacts which is broken when a number of said first mentioned pairs equal in number to the number on said key have been engaged for rendering inoperative the remainder of contacts in said first mentioned pairs.

23. A device of the class described having in combination, a large display panel having a multiplicity of units mounted therein, said units being arranged in vertical rows, each unit carrying a plurality of rotatable members carrying numbers from 0 to 9, one number of each member being in display position and the numbers on said members in display position being in such alignment as to display a certain sum, a keyboard having a plurality of rows of keys, each row having keys numbered from 0 to 9, said rows corresponding to the units, tens, hundreds, etc. positions of the digits in said sum, a relay for each of said keys, a control member comprising groups of pairs of contacts, said groups corresponding to the units, tens and hundreds positions etc. of the digits in said sum and thus to said rows of keys, a motor driven arm movable relatively to said pairs for successively engaging the contacts of each of said pairs to engage the same, a circuit closed by said relay for determining that the number of pairs of contacts engaged by said arm and rendered effective will be the same as the number on said key, a circuit including said contacts of said pairs respectively, and means actuated once for each pair of contacts engaged for turning said wheels in a corresponding group and position from one number to the next.

24. A device for setting up and displaying totals having in combination, a large display panel for displaying said totals having a number of passages therein open at the front of said panel, a multiplicity of units disposed respectively in said passages and accessible at the front of said panel, each of said units carrying a plurality of members arranged in parallel planes and carrying spaced numerals from 0 to 9, actuating elements for said members respectively for moving the same to display different numbers, each of said units being bodily and individually movable in its passage inwardly and outwardly of said panel for bringing said actuating elements into or out of mechanical and electrical engaging and operative position.

25. The structure set forth in claim 24, said unit having means on its front by which it can be pushed inwardly to operative position, means for locking said units in operative position, and means for automatically moving said units outwardly to inoperative position when said locking means is released.

26. A device of the class described having in combination, a large display panel having a multiplicity of units mounted therein, each unit carrying a plurality of rotatable members each carrying numbers from 0 to 9, one number on each member being in display position and the numbers on said members in display position being in such alignment as to display a certain sum, means for moving said members to display a desired sum, each of said units being in position to be manually moved inwardly of said panel to an operative position and outwardly to an inoperative position, a code number for each unit displayed adjacent the same, a keyboard having a plurality of rows of keys, each row having depressible keys numbered from 0 to 9, the number of rows being equal to the number of digits in said code number, solenoids for operating said keys and a circuit for each of said solenoids including a stationary contact and a contact carried by said unit and moved into engagement with said stationary contact when said unit is moved inwardly to operative position.

27. A device of the class described having in combination, a large display panel having a multiplicity of units mounted therein, each unit carrying a plurality of rotatable members carrying numbers from 0 to 9, one number of each member being in display position and the numbers on said members in display position being in such alignment as to display a certain sum, means for moving said members to display a desired sum, each of said units being disposed to be manually moved inwardly of said panel to an operative position and outwardly to an inoperative position, a keyboard having a plurality of rows of keys, the keys in each of said rows being numbered from 0 to 9, the number of rows being equal to the number of digits in said sum, means including solenoids for each of said rows for moving said rotatable members, a holding solenoid for each of said solenoids, a control device having groups of pairs of contacts, said groups corresponding to the units, tens, hundreds, etc. positions of the digits in said sum and the pairs of contacts in each group corresponding to the keys in each of said rows, a motor driven arm movable relatively to said pairs to engage the contacts of said pairs respectively to actuate said first mentioned solenoid, and a circuit closed after depression of the keys forming said sum and the beginning of movement of said arm for first actuating said holding solenoids and subsequently operating said first mentioned solenoids.

28. A device of the class described having in combination, a large display panel having a multiplicity of units mounted therein, each unit carrying a plurality of rotatable members carrying numbers from 0 to 9, one number on each member being in display position and the numbers on said members in display position being in such alignment as to display a certain sum, means for moving said members to indicate a desired sum, each of said units being in position to be manually moved inwardly of said panel to an operative position and being movable outwardly to an inoperative position, a code number for each unit displayed adjacent the same, a keyboard having a plurality of rows of keys, the keys of each row being numbered from 0 to 9, a control member having groups of pairs of contacts, said groups corresponding to the units, tens, hundreds, etc. positions of the digits in said sum and said pairs in each group corresponding to the said keys in each of said rows, a motor driven arm movable relatively to said groups for successively engaging the contacts of said pairs, an impulse actuating means for moving said members step by step, and means actuated when one of said keys is depressed for closing the contacts of a number of said pairs to give a number of impulses to said actuating means for turning one of said members, a number of steps corresponding to the number on said depressed key.

29. A device of the class described having in combination, a display panel having a multiplicity of units mounted therein, each unit carrying a plurality of rotatable members carrying numbers from 0 to 9, one number on each member being in display position and the numbers on said members in display position being in alignment to display a certain sum, a gear secured to each of said members, said members representing the units, tens, hundreds, etc. positions of the digits in said sum, a keyboard having rows of keys, the keys in each row being numbered from 0 to 9, a control device having groups of pairs of electrical contacts, said groups corresponding to said units, tens, hundreds, etc. positions of the digits in said sum and said pairs corresponding to the keys in said rows respectively, a motor-driven member movable relatively to said contacts to successively engage the contacts in said pairs, an actuating means for said members and an electrical circuit closed when said pairs of contacts are engaged for operating said actuating means and a circuit closed when a key is depressed for rendering ineffective the engagement of said contacts after the number thereof equal to the number on said key have been engaged.

30. The structure set forth in claim 29, said actuating means including a solenoid in said circuit energized each time a pair of said contacts are engaged until the number of pairs engaged equals the number on the key which has been operated.

31. The structure set forth in claim 29, said rotatable members being of plate-like form and disposed side by side in parallel planes, a gear secured alongside of and to each of said members, said gears and members in said device being vertically aligned, a plurality of racks arranged side by side adapted to respectively engage all of said vertically aligned gears, a second rack for moving said racks and a solenoid in said circuit for each of said groups for operating said second rack energized each time a pair of said contacts are closed until the number of energizations equals the number on the key operated.

32. A device of the class described having in combination, a display panel, a multiplicity of units mounted therein, each unit comprising a plurality of rotatable wheels having numerals from 0 to 9 on their peripheries, one numeral of each member being in display position and the numbers on said wheels in display position being in such alignment as to display a certain sum, a plurality of racks for respectively turning said wheels, said units carrying gears, each of said units being manually movable in said panel to operative position to engage said gears with said racks respectively, said units having slots open at their tops, means comprising a key adapted to move into said slots respectively to lock said units in operative position, a member carrying all of said keys, and means for lifting said member to disengage all of said keys from all of said slots.

33. An accounting and recording device having in combination, a large stationary display panel, a multiplicity of units mounted in said panel, each of said units comprising a plurality of separately rotatable members each having thereon a plurality of spaced characters, one of which characters is in display position on said panel, said characters in display position in a unit being aligned so as to form a certain sum, operating means for all of said members, said units each being bodily slidable inwardly and outwardly in said panel to bring said members of said units respectively into or out of operative relation to said operating means, said operating means including pairs of electrical contacts one of which is carried on said unit, said contacts being engaged when said unit is moved inwardly to operative position.

34. A recording and display machine having in combination, a display panel having a multiplicity of openings therein arranged in vertical rows, a multiplicity of units respectively disposed in said openings, each of said units carrying a plurality of movable members each carrying numbers from 0 to 9 respectively, each member being adapted to be moved step by setp to display one number with said numbers of said unit in alignment so that a certain sum is displayed by each of said units, said members in said units being vertically aligned in said rows, a keyboard having rows of keys so that there is a row for each member of one of said units, the keys in each of said rows carrying numbers from 0 to 9 respectively, each of said members having a gear secured thereto, second gears meshing respectively with said gears, racks meshing respectively with each of said first mentioned gears in said vertical rows, shafts on which said second gears are mounted respectively, a third gear on each of said shafts, second racks meshing with each of said third gears, a solenoid for moving each of said second racks, and means actuated by the depression of one of said keys for actuating said solenoid repeatedly a number of times equal to the number on said key for moving said second rack step by step whereby actuations of said solenoids and said second racks will move the respective racks meshing with the gears of each unit respectively.

35. The structure set forth in claim 34, pawls for actuating said second racks operated by said solenoids, a holding pawl for each of said second racks and solenoids operated each time said first mentioned solenoids are actuated for operating said holding pawls respectively.

36. A recording and display machine having in combination, a display panel having a multiplicity of openings therein, a multiplicity of units respectively disposed in said openings, each of said units carrying a plurality of movable members each carrying numbers from 0 to 9 respectively, each member being adapted to be moved step by step to display one number with said numbers of said unit in alignment so that a certain sum is displayed by each of said units, a keyboard having rows of keys so that there is a row for each member of one of said units, the keys in each of said rows carrying numbers from 0 to 9 respectively, an actuating means for each of said members, groups each having ten pairs of normally separated contacts and ten pairs of normally engaged contacts, a relay for each of said keys, a pair of contacts closed by said relay, a driven rotatable member movable adjacent said groups for successively engaging said pairs of open contacts and separating said pairs of engaged contacts, a circuit closed through the pair of engaged contacts corresponding to the number on the operated key, a second relay, a second circuit closed by said second relay whereby when said rotatable member separates the pair of closed contacts corresponding to the number on said key said second circuit will be broken thus breaking said first mentioned circuit and rendering inoperative the action of said rotatable member on the remaining contacts of said groups.

37. A recording and display machine having in combination, a display panel having a multiplicity of openings therein, a multiplicity of units respectively disposed in said openings, each of said units carrying a plurality of movable members each carrying numbers from 0 to 9 respectively, each member being adapted to be moved step by step to display one number with said numbers of said unit in alignment so that a certain sum is displayed by each of said units, a code number for each of said units, a keyboard having rows of keys equal in number to the number of characters in said code number, a solenoid for each of said keys, each of said units being movable inwardly of said panel, contacts engaged when a unit is so moved inwardly, a circuit closed through the solenoids corresponding to the said code number, and means actuated by said solenoid for printing said code number on a tape.

38. A recording and display machine having in combination, a display panel having a multiplicity of openings therein, a multiplicity of units respectively disposed in said openings, each of said units carrying a plurality of movable members each carrying numbers from 0 to 9 respectively, each member being adapted to be moved step by step to display one number with said numbers of said unit in alignment so that a certain sum is displayed by each of said units, a keyboard having rows of keys so that there is a row for each member of one of said units, the keys in each of said rows carrying numbers from 0 to 9 respectively, a relay for each of said keys, means for moving said wheels step by step to bring the desired numbers into display positions respectively, a circuit closed by said relay for actuating said means, a second relay in said circuit, a holding circuit for said first mentioned circuit closed by said second relay, means for breaking said holding circuit and thus said first mentioned circuit when each of said members have been moved a number of steps equal to the numbers on the respective keys operated.

39. The structure set forth in claim 38, said first mentioned means comprising a plurality of racks disposed side by side, a gear on each of said wheels meshing respectively with said racks, a second rack geared to said racks respectively, and a solenoid actuated by said first mentioned circuit for operating said solenoid.

40. The structure set forth in claim 38, each of said units being movable inwardly of said panel to bring said gears into operative relation to said first mentioned racks and being movable outwardly to bring said first mentioned gears out of operative relation to said first mentioned racks.

41. A recording and display machine having in combination, a display panel having a multiplicity of openings therein, a multiplicity of units respectively disposed in said openings, each of said units carrying a plurality of movable members each carrying numbers from 0 to 9 respectively, each member being adapted to be moved step by step to display one number with said numbers of said unit in alignment so that a certain sum is displayed by each of said units, a keyboard having rows of keys so that there is a row for each member of one of said units, the keys in each of said rows carrying numbers from 0 to 9 respectively, means for moving said wheels step by step a number of times equal to the number on an operated key, a code number for each unit displayed adjacent said unit, a second keyboard having rows of keys numbered 0 to 9 respectively, a number of said last mentioned rows being equal to the number of digits in said code number, said units having electrical contacts thereon, stationary contacts arranged to be engaged respectively with said contacts when said unit is moved inwardly, and means for printing said code number upon a tape including a circuit comprising said contacts.

42. A device of the class described having in combination, a display panel, a multiplicity of units mounted in said panel, each unit carrying a plurality of rotatable members each carrying numerals from 0 to 9, one numeral of each member being in display position and the numerals in display position being in such alignment that a certain sum is displayed, electrically actuated means for moving said members step by step a distance between two adjacent members, a keyboard having rows of keys equal in number to the number of digits in said sum, the keys in each row being numbered 0 to 9, a device having sets of ten pairs of spaced contacts, said sets being equal in number to and corresponding to the digits in said sum, a driven movable member in said device adapted successively to engage said contacts in said pairs, means actuated when one of said keys is operated to move said movable member, circuits closed respectively by said pairs of contacts when engaged for actuating said first mentioned means a number of times equal to the number on said key, and a second circuit closed when said key is operated to make ineffective the engagement of the remaining contacts in said set whereby said first mentioned members will be moved to display a sum formed by the numbers of the operated keys.

43. A device of the class described having in combination, a large display panel, a multiplicity of units mounted in said panel, said units being arranged in vertical rows, each unit carrying a plurality of rotatable wheels having thereon numbers from 0 to 9, one number of each member being in display position and the numbers on said members in display position being in such alignment as to display a certain sum, a keyboard having a plurality of rows of keys, each row having keys numbered from 0 to 9, said rows corresponding to the units, tens, hundreds, etc. positions of the digits in said sum, said wheels being arranged side by side, a gear on each of said wheels, racks meshing with each of said gears respectively and arranged side by side, said racks meshing with all of said gears which are in vertical alignment, said racks being movable vertically but fixed against lateral movement, second gears meshing with said racks respectively, a third gear meshing with each of said second gears, shafts to which said third gears are respectively secured, a fourth gear on each of said shafts, second racks meshing with said fourth gears respectively, all of said gears being fixed against bodily movement, and means for moving said second racks step by step for moving said wheels a number of times equal to the respective keys operated, said last mentioned means comprising solenoids for actuating said second racks respectively, said solenoids being actuated a number of times equal to the number on the operated keys, second solenoids for said second racks respectively, means for actuating said second solenoids each time a corresponding one of said first mentioned solenoids is operated, and means actuated by said second solenoids preventing downward movement of said second racks between the actuations of said first mentioned solenoids.

44. A recording and display machine having in combination, a display panel having a multiplicity of openings therein, a multiplicity of units respectively disposed in said openings, each of said units carrying a plurality of movable members each carrying numbers from 0 to 9 respectively, each member being adapted to be moved step by step to display one number with said numbers of said unit in alignment so that a certain sum is displayed by each of said units, a keyboard having rows of keys so that there is a row for each member of one of said units, the keys in each of said rows carrying numbers from 0 to 9 respectively, each of said units being accessible at the front of said panel, and being movable inwardly and outwardly of said panel to and from operative position respectively, and means operated when a unit is in operative position and a key is depressed for moving the member corresponding to said key to display the number on said key.

45. The structure set forth in claim 44, a contact on said unit, a stationary contact, said contacts being engaged when said unit is moved to operative position and forming part of a circuit forming part of said means.

46. The structure set forth in claim 44, said units being movable inwardly manually and automatically acting means for moving said units outwardly.

47. A recording and display machine having in combination, a display panel having a multiplicity of openings therein, a multiplicity of units respectively disposed in said openings, each of said units carrying a plurality of movable members each carrying numbers from 0 to 9 respectively, each member being adapted to be moved step by step to display one number with said numbers of said unit in alignment so that a certain sum is displayed by each of said units, a keyboard having rows of keys so that there is a row for each member of one of said units, the keys in each of said rows carrying numbers from 0 to 9 respectively, each of said units being bodily movable inwardly and outwardly at the front of said panel to operative and inoperative positions respectively, and means operated when a unit is in operative position and a key is depressed for moving the member corresponding to said key to display the number on said key.

References Cited in the file of this patent

UNITED STATES PATENTS

| | | |
|---|---|---|
| 982,938 | Cleal | Jan. 31, 1911 |
| 1,084,612 | Crumpton | Jan. 20, 1914 |
| 1,259,311 | Steele | Mar. 12, 1918 |
| 1,414,978 | Bumstead | May 2, 1922 |
| 1,514,954 | Crumpton | Nov. 11, 1924 |
| 1,805,665 | Hough | May 19, 1931 |
| 1,809,157 | Brand | June 9, 1931 |
| 1,858,626 | Jacob | May 17, 1932 |
| 1,858,807 | Eichenauer | May 17, 1932 |
| 1,899,936 | Bricken | Mar. 7, 1933 |
| 2,057,606 | Campos | Oct. 13, 1936 |
| 2,368,761 | Hogan | Feb. 6, 1945 |
| 2,374,760 | Lindstein | May 1, 1945 |
| 2,376,481 | Gubelmann | May 22, 1945 |
| 2,403,873 | Mumma | July 9, 1946 |
| 2,432,324 | May | Dec. 9, 1947 |
| 2,600,144 | Watson | June 10, 1952 |

FOREIGN PATENTS

| | | |
|---|---|---|
| 244,013 | Germany | June 3, 1909 |
| 364,477 | Germany | Nov. 25, 1922 |
| 270,044 | Great Britain | May 6, 1927 |
| 331,182 | Great Britain | June 24, 1930 |
| 533,586 | Great Britain | Feb. 17, 1941 |